United States Patent
Kimura et al.

(10) Patent No.: US 7,031,076 B2
(45) Date of Patent: *Apr. 18, 2006

(54) OBJECTIVE LENS, OPTICAL SYSTEM AND OPTICAL PICKUP APPARATUS

(75) Inventors: Tohru Kimura, Hachioji (JP); Kazutaka Noguchi, Hachioji (JP)

(73) Assignee: Konica Minolta Holdings, Inc., Tokyo (JP)

(*) Notice: Subject to any disclaimer, the term of this patent is extended or adjusted under 35 U.S.C. 154(b) by 76 days.

This patent is subject to a terminal disclaimer.

(21) Appl. No.: 10/714,614

(22) Filed: Nov. 18, 2003

(65) Prior Publication Data

US 2004/0100703 A1  May 27, 2004

(30) Foreign Application Priority Data

Nov. 21, 2002 (JP) ............................ 2002-337788

(51) Int. Cl.
*G02B 13/18* (2006.01)
*G11B 7/00* (2006.01)

(52) U.S. Cl. .................................. 359/719; 369/112.26
(58) Field of Classification Search ................ 359/718, 359/719, 708; 369/112.26
See application file for complete search history.

(56) References Cited

U.S. PATENT DOCUMENTS

2004/0213131 A1* 10/2004 Kimura et al. .......... 369/112.03
2004/0264349 A1* 12/2004 Kimura et al. .......... 369/112.07

* cited by examiner

*Primary Examiner*—Scott J. Sugarman

(74) *Attorney, Agent, or Firm*—Finnegan, Henderson, Farabow, Garrett & Dunner, L.L.P.

(57) ABSTRACT

An optical system for use in an optical pickup apparatus has a chromatic aberration correcting element having plural ring-shaped zones divided with a stepped section in such a way that one of the neighboring ring-shaped zones located apart from the optical axis has a longer optical path than the other one located closer to the optical axis, and an objective lens having plural ring-shaped zones divided with a stepped section shaped in the optical axis direction in such a way that the stepped section causes a optical path difference between light fluxes having passed through the neighboring ring-shaped zones. The ring-shaped zonal structure of the chromatic aberration correcting element corrects a deviation of a focal point caused by the objective lens due to a wavelength fluctuation of an incident light flux coming into the optical system.

69 Claims, 15 Drawing Sheets

PARALLEL LIGHT FLUX AT
STANDARD WAVELENGTH $\lambda_0$ nm

CONVERGED LIGHT FLUX AT
(WAVELENGTH $\lambda_0 + \Delta\lambda$) nm

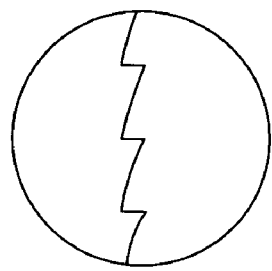
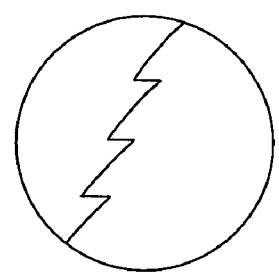
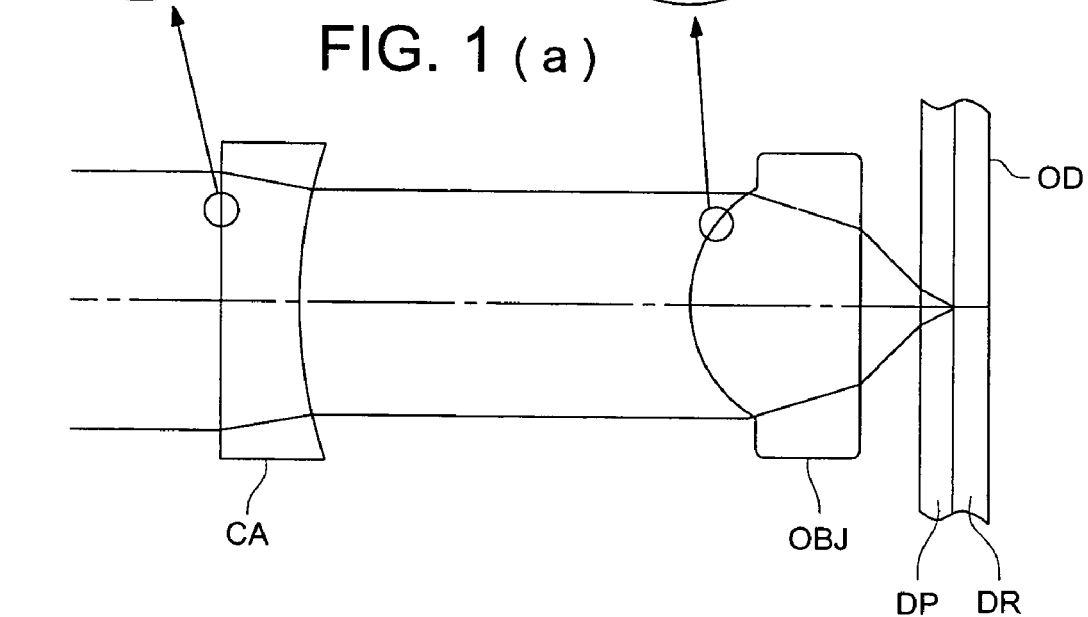
FIG. 1(b)
FIG. 1(c)
FIG. 1(a)

PARALLEL LIGHT FLUX AT STANDARD WAVELENGTH $\lambda_0$ nm $\lambda_0$ (nm)

SPHERICAL ABERRATION

CONVERGED LIGHT FLUX AT (WAVELENGTH $\lambda_0 + \Delta\lambda$) nm $\lambda_0 + \Delta\lambda$ (nm)

SPHERICAL ABERRATION

DIVERGED LIGHT FLUX AT (WAVELENGTH $\lambda_0 - \Delta\lambda$) nm $\lambda_0 - \Delta\lambda$ (nm)

SPHERICAL ABERRATION

WAVELENGTH CHARACTERISTIC OF SPHERICAL ABERRATION OF REFRACTING LENS

WAVELENGTH CHARACTERISTIC 1 OF SPHERICAL ABERRATION OF OBJECTIVE LENS OBJ

WAVELENGTH CHARACTERISTIC 2 OF SPHERICAL ABERRATION OF OBJECTIVE LENS OBJ

WAVELENGTH CHARACTERISTIC 3 OF SPHERICAL ABERRATION OF OBJECTIVE LENS OBJ

FIG. 6(a)
FIG. 6(b)
FIG. 6(c)
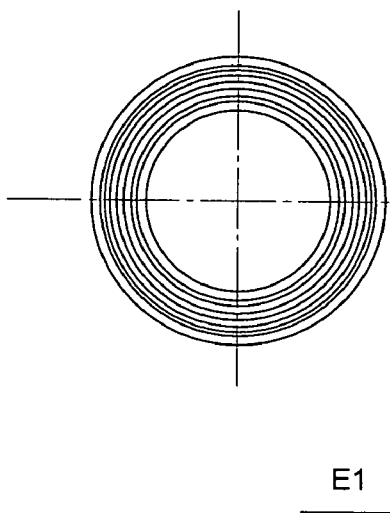
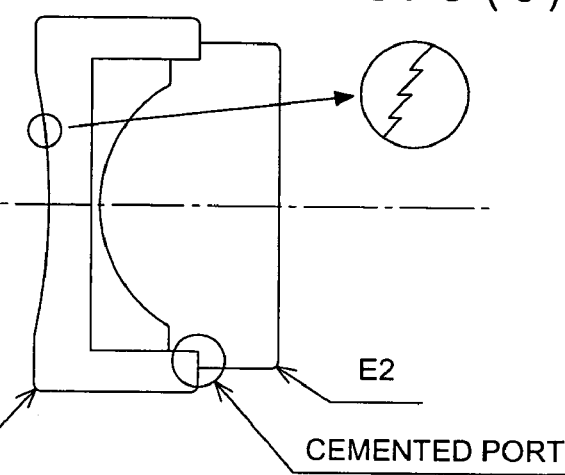
E1
E2 CEMENTED PORTION

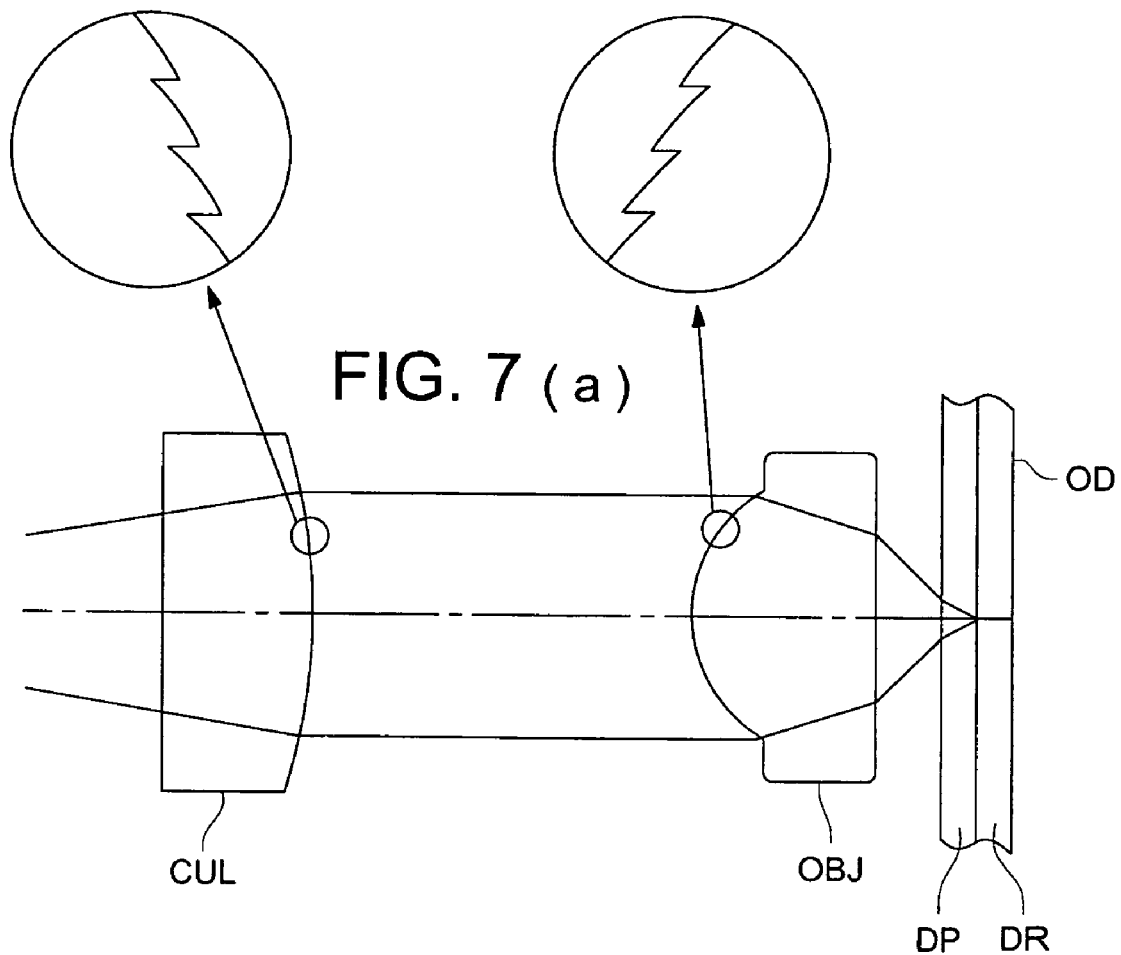

FIG. 9(b)
FIG. 9(c)
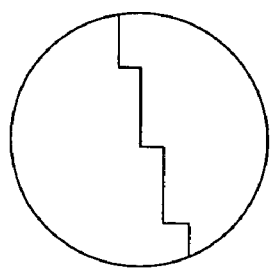
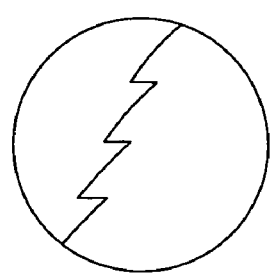
FIG. 9(a)
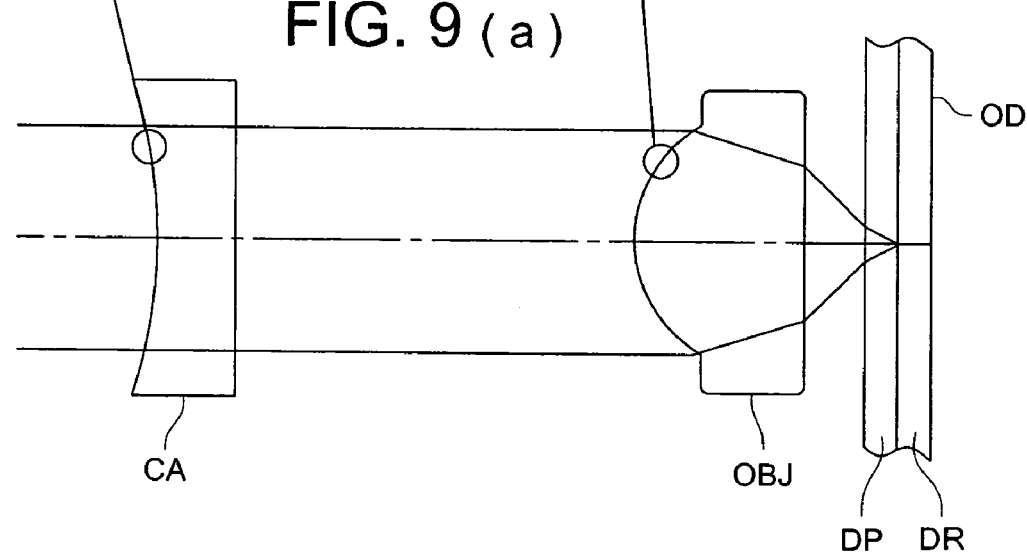

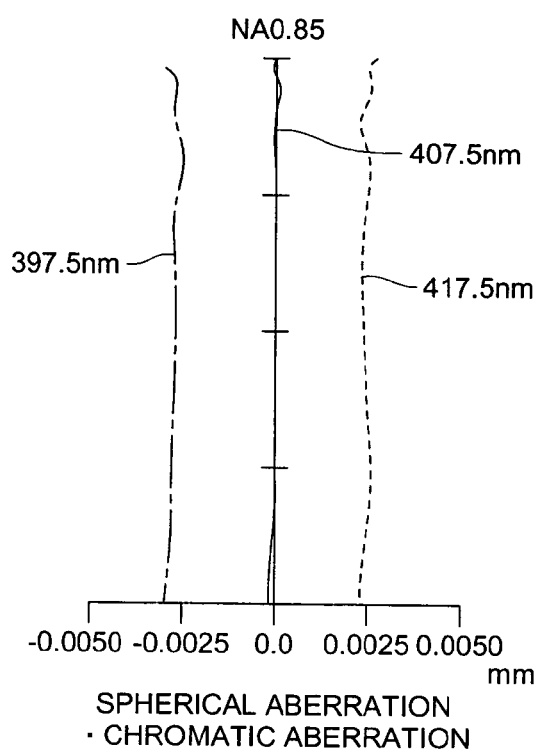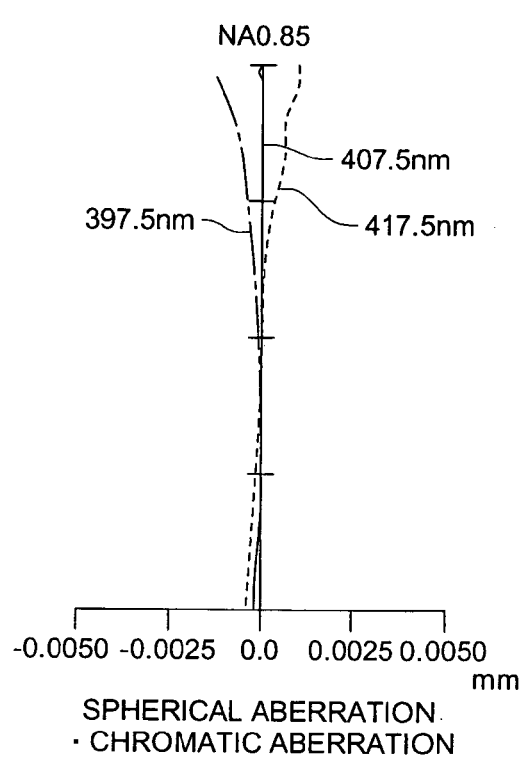
FIG. 11(a) SPHERICAL ABERRATION · CHROMATIC ABERRATION
FIG. 11(b) SPHERICAL ABERRATION · CHROMATIC ABERRATION

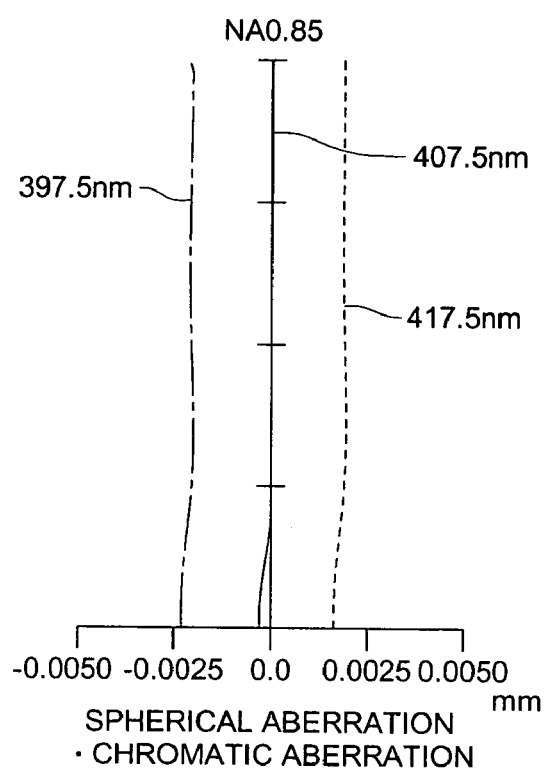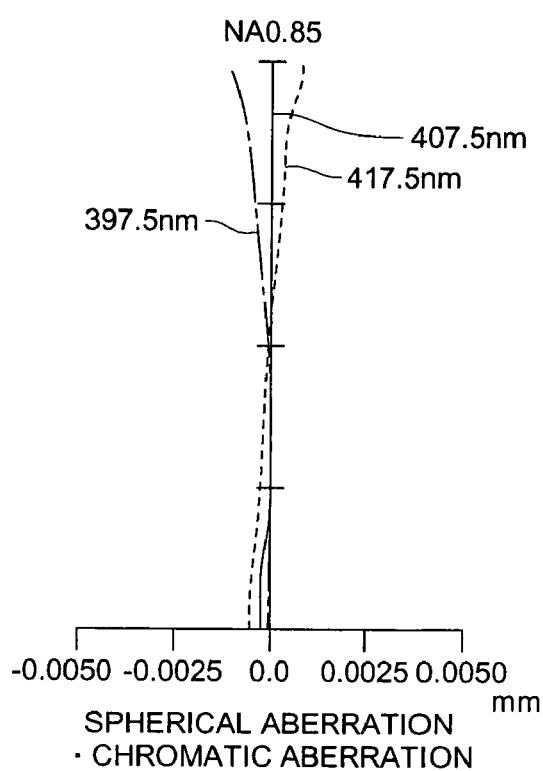
FIG. 13 (a)
FIG. 13 (b)

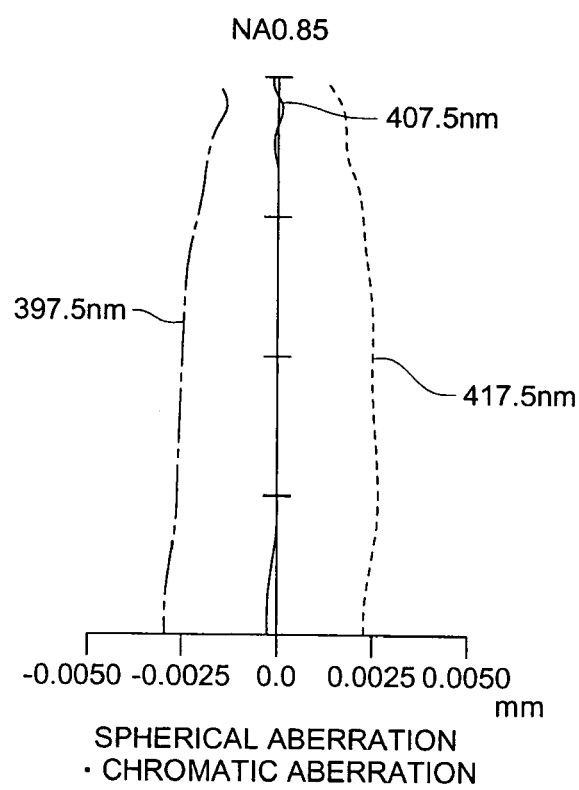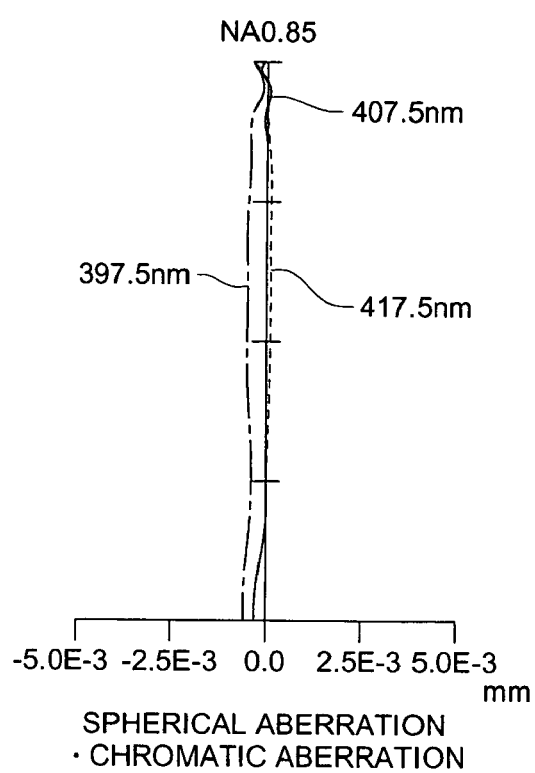
FIG. 14 (a)
FIG. 14 (b)

SPHERICAL ABERRATION
· CHROMATIC ABERRATION

SPHERICAL ABERRATION
· CHROMATIC ABERRATION

OBJECTIVE LENS, OPTICAL SYSTEM AND OPTICAL PICKUP APPARATUS

BACKGROUND OF THE INVENTION

The present invention relates to an optical system for an optical pickup device, an optical pickup device and an objective lens, and in particular, to an optical system for an optical pickup device, an optical pickup device and an objective lens which can achieve high density recording or reproducing for information.

As is known as CD (compact disc) or DVD (digital versatile disc), an optical disc has been used for storage of digital data such as accumulation of music information and image information or storage of computer data. Further, with the recent advent of an information-oriented society, there are actual circumstances wherein large capacities of the optical discs are strongly demanded.

In this case, an improvement of recording capacity (recording density) per a unit area can be realized by making a spot diameter of a light-converged spot obtained from the optical system for an optical pickup device, in the optical disc. Since this spot diameter is proportional to λ/NA (in which, λ represents a wavelength of a light source and NA represents a numerical aperture on the image side of the objective lens) as is known widely, a short wavelength of the light source used in the optical pickup device and a high numerical aperture of the objective lens arranged to face the optical disc are effective for making a spot diameter.

Among the foregoing, with respect to the short wavelength of the light source, researches of a violet semiconductor laser generating a laser beam with a wavelength of about 400 nm have been advanced, and it seems to be put to practical use in the near future. In the case of the optical pickup device, in this case, laser power for recording is generally greater than that for reproducing, and therefore, when switching from reproducing to recording, there is sometimes caused the so-called mode hopping phenomenon wherein an output change makes a central wavelength to hop instantaneously by several nanometers. Defocus errors caused by this mode hopping phenomenon can be removed by conducting focusing operations for the objective lens. However, if chromatic aberration of the objective lens is not corrected, troubles such as recording failures caused by defocus errors occur for a period of several nanoseconds up to the moment when the objective lens is subjected to focusing operations. Since longitudinal chromatic aberration of an objective lens grows greater as a wavelength of a light source for a light flux that passes through the objective lens becomes shorter, deterioration of wavefront aberration caused by a mode hopping phenomenon tends to grow greater when a wavelength of a light source becomes shorter. From the reasons above, it is necessary to correct longitudinal chromatic aberration of the objective lens on the optical pickup device wherein a violet semiconductor laser is especially used as a light source.

As an element to correct longitudinal chromatic aberration of the objective lens in a simple structure, there is known a diffractive element utilizing diffracting actions. In the optical pickup device employing a violet semiconductor laser as a light source, an optical pickup device equipped with the diffractive element for correcting longitudinal chromatic aberration of the objective lens and an optical system for the optical pickup device are described in the following Patent Documents 1–3.

(Patent Document 1)
 TOKKAI No. 2001-256672

(Patent Documen 2)
 TOKKAI No. 2001-108894

(Patent Documen 3)
 TOKKAI No. 2002-082280

(Problems to be Solved by the Invention)

An optical pickup device described in the aforementioned Patent Document 1 is one wherein longitudinal chromatic aberration of an objective lens is corrected by a diffractive element arranged in a parallel light flux between a violet semiconductor laser light source and an objective lens, an optical system for an optical pickup device described in the aforementioned Patent Document 2 is one wherein a diffractive structure is formed on an optical surface of a collimator lens for converting a divergent light flux emitted from a violet semiconductor laser light source into a parallel light flux to lead it to an objective lens, and thereby, longitudinal aberration of the objective lens is corrected by the actions of the diffractive structure, and an optical pickup device described in the Patent Document 3 is one wherein a diffractive structure is formed on an optical surface of an expander lens arranged in a parallel light flux between a violet semiconductor laser light source and an objective lens, and thereby, longitudinal chromatic aberration of the objective lens is corrected by the actions of the diffractive structure.

In the aforementioned optical pickup device and the optical system for the optical pickup device, when a wavelength of the semiconductor laser is changed by actions of the diffractive structure in the direction to become longer than a design wavelength of the optical system for the optical pickup device, a light flux which has emerged from a chromatic aberration element and advances to the objective lens becomes a converged light flux, while, a light flux becomes a divergent light flux when a wavelength of the semiconductor laser is changed to become shorter than a design wavelength of the optical system for the optical pickup device, and therefore, by utilizing this characteristic, the longitudinal chromatic aberration of an objective lens can be corrected. However, if an angle of divergence of the light flux advancing toward the objective lens is changed by wavelength changes of a semiconductor laser, in the aforesaid manner, spherical aberration is caused because a magnification of the objective lens is changed.

A wavelength difference of about ±10 nm caused by manufacture errors exists between semiconductor laser individuals each being used as a light source in an optical pickup device. When using a semiconductor laser whose wavelength is deviated from a design wavelength of the optical system for an optical pickup device as stated above, in the aforementioned optical pickup device and the optical system for the optical pickup device, initial adjustment for a position of a collimator lens and that for a position of a semiconductor laser are necessary for eliminating spherical aberration that is caused by changes of magnification of the objective lens, which increases manufacturing cost for the optical pickup device.

In particular, the problem stated above is in a tendency that it is actualized by a single lens representing an objective lens having a high numerical aperture which is generally one way to realize cost reduction and downsizing of an optical pickup device. In a single lens, spherical aberration increases in proportion to the fourth power of the numerical aperture. It is therefore necessary to correct spherical chromatic aberration remaining on the objective lens itself in addition to spherical aberration changes caused by magnification changes of the objective lens, in adjustment of a collimator lens position and in the initial adjustment of a semiconductor laser position. Further, to realize a single lens for an objective lens having a high numerical aperture, it is preferable to use a material having a high refractive index, for securing margin for shifting of the optical axis between optical surfaces.

However, the material having a high refractive index is generally of low divergence, and therefore, an amount of longitudinal chromatic aberration to be corrected by a chromatic aberration correcting element is in a tendency to grow greater. Therefore, for correcting longitudinal chromatic aberration of an objective lens that is made of the material with high refractive index, it is necessary that changes in degrees of divergence of the light flux advancing toward the objective lens from a chromatic aberration correcting element caused by changes of wavelength of semiconductor laser are established to be large, which results in that changes in magnification of the objective lens becomes large when using the semiconductor laser whose wavelength is deviated from a design wavelength of the optical system of the optical pickup device. Therefore, an occurrence of spherical aberration caused by changes in magnification of the objective lens is increased, which increases an amount of initial adjustment for a collimator lens position and an amount of initial adjustment for a semiconductor laser position.

For the problems mentioned above, it is possible to eliminate spherical aberration caused by the changes of magnification of the objective lens, by designing a chromatic aberration correcting element so that spherical aberration (hereinafter, spherical aberration in the case where a wavelength of incident light is changed is called spherical chromatic aberration) may be changed when a wavelength of the semiconductor laser is changed.

However, if spherical chromatic aberration remains on the chromatic aberration correcting element, when using a violet semiconductor laser whose wavelength is deviated from a design wavelength of the optical system for the optical pickup device by manufacture errors, deviation of an optical axis is caused by driving for tracking of an objective lens, and coma which is not negligible is caused, resulting in a fear that satisfactory tracking characteristics are not obtained and recording failure or reproducing failure is caused.

SUMMARY OF THE INVENTION

The invention has been achieved in view of the problems mentioned above, and its object is to provide an optical system for an optical pickup device housed in the optical pickup device employing a violet light source with a short wavelength, wherein occurrence of spherical aberration is sufficiently less when a wavelength of incident light is changed, and occurrence of coma is sufficiently less even when an objective lens is eccentric in the direction perpendicular to the optical axis from the chromatic aberration correcting element, when a wavelength of incident light is changed. Its further object is to provide an objective lens that can be applied to an optical system for the optical pickup device. Providing of an optical pickup device in which an optical system for the optical pickup device and an objective lens are housed is also an object of the invention.

The above objects can be attained by the following structures.

An optical element for an optical pickup device described in Item 1 is one equipped with a chromatic aberration correcting element and an objective lens that converges a light flux coming from the chromatic aberration correcting element, wherein the chromatic aberration correcting element is composed of plural ring-shaped zones divided by microscopic steps, and has, on at least one optical surface thereof, a ring-shaped zonal structure that is displaced in the direction of an optical axis on each boundary so that an optical path length for a light flux that has passed through an outer ring-shaped zone may be longer than that for a light flux that has passed through an inner ring-shaped zone, the objective lens is composed of plural ring-shaped zones divided by microscopic steps, and has, on at least one optical surface thereof, a ring-shaped zonal structure wherein adjoining ring-shaped zones generate a prescribed optical path difference for prescribed incident light, and the following expression is satisfied when $\Delta SAR$ represents an amount of changes of spherical aberration of a marginal light beam in the case when light with a wavelength that is longer by 10 nm than the design wavelength for spherical aberration of marginal light beam in the case when light with the design wavelength enters a refracting lens that has the design wavelength, material, focal length, numerical aperture on the image side, magnification, lens thickness and back focus which are the same as those of the aforesaid objective lens and does not have the aforementioned ring-shaped structure, and when $\Delta SAD$ represents an amount of changes of spherical aberration of a marginal light beam in the case when light with a wavelength that is longer by 10 nm than the design wavelength for spherical aberration of a marginal light beam in the case when light with the design wavelength enters the aforesaid objective lens.

$$\Delta SAR > \Delta SAD \tag{1}$$

BRIEF DESCRIPTION OF THE PREFERRED EMBODIMENT

FIG. 1(a) is a sectional view of optical system OS for an optical pickup device relating to the invention, FIG. 1(b) is an enlarged view of an optical surface of a chromatic aberration correcting element, and FIG. 1(c) is an enlarged view of an optical surface of an objective lens.

FIGS. 2(a) to 2(c) each shows a schematic sectional view of the optical system for an optical pickup device and FIGS. 2(d) to 2(f) each shows a diagram of spherical aberration.

FIGS. 3(a) to 3(d) each is a diagram illustrating correction of spherical aberration of the optical system for an optical pickup device.

FIG. 4 shows diagrams illustrating the optical element of the optical system for an optical pickup device relating to the invention, and FIG. 4(a) is a front view, while, FIG. 4(b) is a sectional view.

FIG. 5 shows diagrams illustrating an optical element of the optical system for an optical pickup device relating to the invention.

FIG. 6 shows diagrams illustrating the optical system for an optical pickup device relating to the invention, and FIG. 6(a) is a front view, FIG. 6(b) is a sectional view, and FIG. 6(c) is a partially enlarged diagram of the sectional view.

FIG. 7(a) is a sectional view of optical system OS for an optical pickup device relating to the invention, FIG. 7(b) is an enlarged view of an optical surface of a coupling lens representing a chromatic aberration correcting element, and FIG. 7(c) is an enlarged view of an optical surface of an objective lens.

FIG. 9(a) is a sectional view of optical system OS for an optical pickup device relating to the invention, FIG. 9(b) is an enlarged view of an optical surface of a chromatic aberration correcting element, and FIG. 9(c) is an enlarged view of an optical surface of an objective lens.

FIG. 11(a) is a diagram of spherical aberration in an objective lens of the optical system for an optical pickup device relating to Example 1, and FIG. 11(b) is a diagram of spherical aberration in the total optical system for an optical pickup device relating to Example 1.

FIG. 13(a) is a diagram of spherical aberration in an objective lens of the optical system for an optical pickup device relating to Example 3, and FIG. 13(b) is a diagram of spherical aberration in the total optical system for an optical pickup device relating to Example 3.

FIG. 14(a) is a diagram of spherical aberration in an objective lens of the optical system for an optical pickup device relating to Example 4, and FIG. 14(b) is a diagram of spherical aberration in the total optical system for an optical pickup device relating to Example 4.

Figure 16:
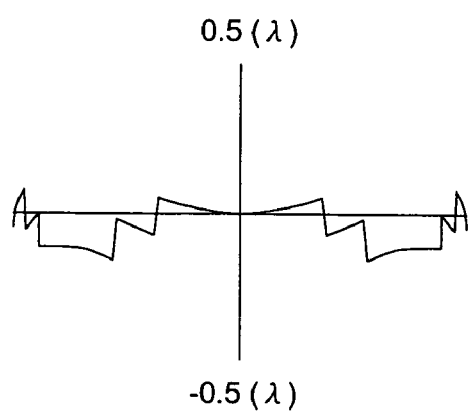
Figure 16:
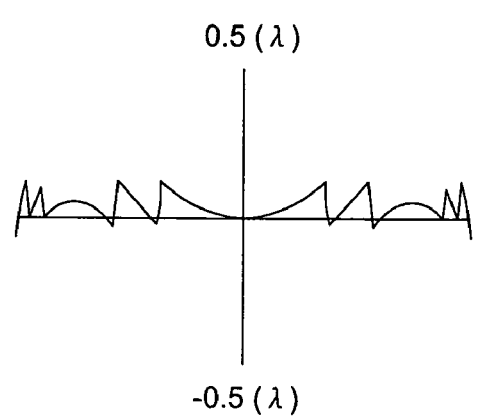

FIGS. 16(a) and 16(b) each is a diagram of wavefront aberration.

Figure 17:
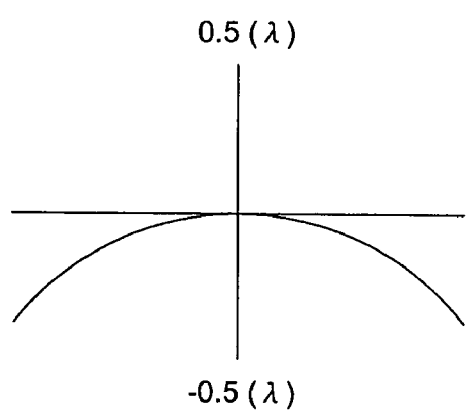
Figure 17:
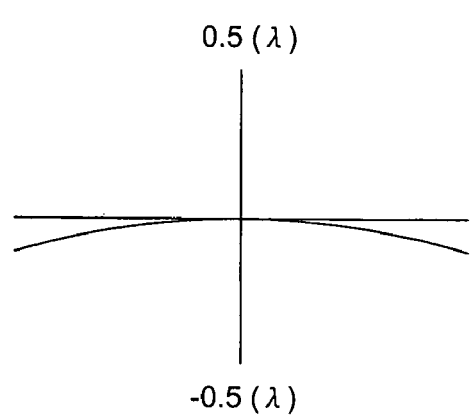

FIGS. 17(a) and 17(b) each is a diagram of wavefront aberration.

DETAILED DESCRIPTION OF THE PREFERRED EMBODIMENT

A principle of the invention will be explained as follows. FIG. 1(a) is a sectional view of optical system OS for an optical pickup device relating to the invention, FIG. 1(b) is an enlarged view of an optical surface of an chromatic aberration correcting element, and FIG. 1(c) is an enlarged view of an optical surface of an objective lens. The optical system OS for an optical pickup device relating to the invention is composed of chromatic aberration correcting element CA arranged in a parallel light flux emitted from an unillustrated violet semiconductor laser light source and collimated by an unillustrated collimator lens and of objective lens OBJ that converges a light flux having passed through the chromatic aberration correcting element CA on information recording surface DR through protective layer DP of optical disk OD, as shown in FIG. 1.

Figure 2A:
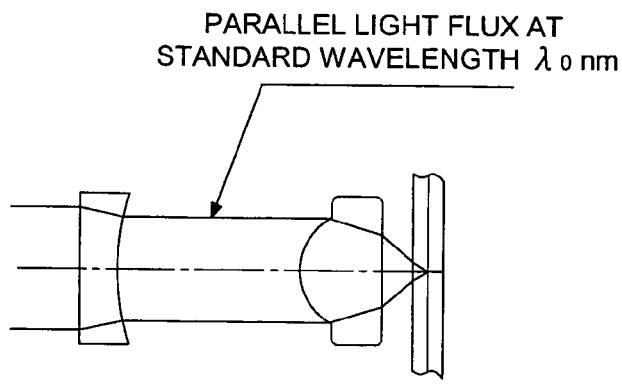
Figure 2D:
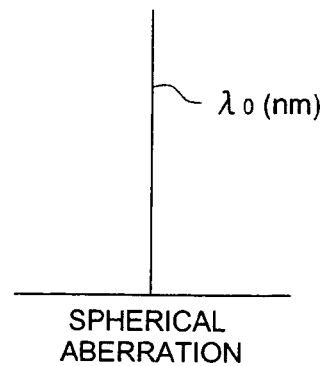

A surface of incidence for a light flux on the chromatic aberration correcting element CA is divided by plural ring-shaped zones as shown in the enlarged view (FIG. 1(B)), and an optical path length of a light flux passing through an outer ring-shaped zone among adjoining ring-shaped zones is displaced in the direction of an optical axis at its boundary so that the optical path length of the light flux passing through the outer ring-shaped zone may be longer than that of a light flux passing through the inner ring-shaped zone. This diffractive structure is a diffractive structure wherein diffracting actions make adjoining ring-shaped zones to generate diffracted light of a prescribed order for prescribed passing incident light, and the chromatic aberration correcting element CA has wavelength keeping quality of paraxial power that changes in the direction wherein the paraxial power grows greater when a wavelength of incident light becomes longer. Therefore, when a wavelength of incident light becomes longer by $\Delta\lambda$ from design wavelength $\lambda_0$, a light flux emerging from the chromatic aberration correcting element CA becomes a convergent light flux, and when a wavelength of incident light becomes shorter by $\Delta\lambda$ from design wavelength $\lambda_0$, on the contrary, a light flux emerging from the chromatic aberration correcting element CA becomes a divergent light flux, and there, the longitudinal chromatic aberration of the objective lens can be corrected by the chromatic aberration correcting element CA because a light flux emerging from the chromatic aberration correcting element CA becomes a divergent light flux (see FIG. 2(a) that is a sectional view of an optical system for an optical pickup device and FIG. 2(d) that is its aberration diagram).

Figure 2B:
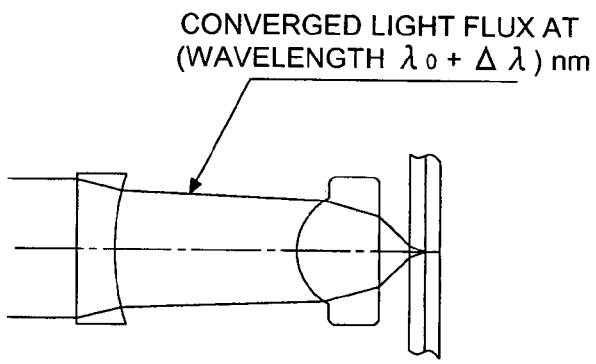
Figure 2E:
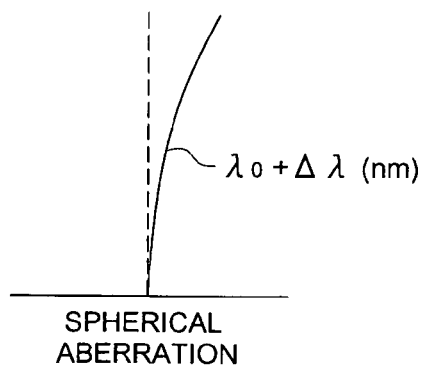

However, when a degree of divergence of the light flux advancing toward an objective lens is changed by changes of a wavelength of a semiconductor laser as stated above, there is generated spherical aberration because a magnification of the objective lens is changed. For example, when a violet semiconductor laser with a wavelength that is longer by $\Delta\lambda$ than design wavelength $\lambda_0$ of the optical system of an optical pickup device is used as shown in FIG. 2(b) representing a sectional view of the optical system of an optical pickup device, a light flux emerging from the chromatic aberration correcting element CA becomes a convergent light flux. Therefore, the magnification of the objective lens is changed to grow greater, and thereby, spherical aberration of the objective lens is changed to become over (see FIG. 2(e)).

Figure 2C:
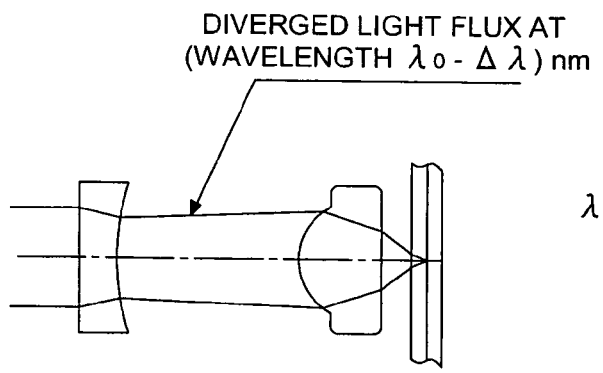
Figure 2F:
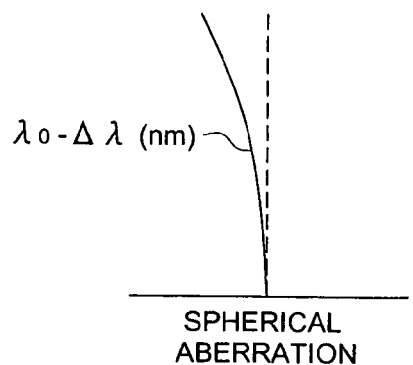

On the other hand, when a violet semiconductor laser with a wavelength that is shorter by $\Delta\lambda$ than design wavelength $\lambda_0$ of the optical system of an optical pickup device is used as shown in FIG. 2(c) representing a sectional view of the optical system of an optical pickup device, a light flux emerging from the chromatic aberration correcting element CA becomes a divergent light flux. Therefore, the magnification of the objective lens is changed to become smaller, and thereby, spherical aberration of the objective lens is changed to become under (see FIG. 2(f)).

For the problems mentioned above, it is possible to eliminate spherical aberration caused by the changes of magnification of the objective lens, by making a ring-shaped zonal structure of the chromatic aberration correcting element CA to have wavelength-dependency wherein, when a wavelength of a semiconductor laser is changed, its spherical aberration is changed.

However, if spherical aberration remains on the chromatic aberration correcting element CA, when using a violet semiconductor laser whose wavelength is deviated from a design wavelength of the optical system for the optical pickup device by manufacture errors, coma is caused by driving for tracking of an objective lens, resulting in a fear that satisfactory tracking characteristics are not obtained.

Therefore, in the case of objective lens OBJ of optical system for optical pickup device OS of the invention, there is provided, on at least one optical surface, a ring-shaped zonal structure that is composed of plural ring-shaped zones divided by microscopic steps, as described in Item 1 and is formed so that adjoining ring-shaped zones generate a prescribed optical path difference for prescribed incident light, and there is provided a wavelength-dependence of spherical aberration wherein the aforesaid expression (1) is satisfied when $\Delta SAR$ represents an amount of changes of spherical aberration of a marginal light beam in the case when light with a wavelength that is longer by 10 nm than the design wavelength enter for spherical aberration of marginal light beam in the case when light with the design wavelength enters a refracting lens that has the same design wavelength, material, focal length, numerical aperture on the image side, magnification, lens thickness and back focus and does not have the aforementioned ring-shaped structure, and when $\Delta SAD$ represents an amount of changes of spherical aberration of a marginal light beam in the case when light with a wavelength that is longer by 10 nm than the design wavelength enters, for spherical aberration of a marginal light beam in the case when light with the design wavelength enters the aforesaid objective lens. Incidentally, wording "design wavelength" used in the present specification means a wavelength wherein aberration is minimum when rays of light each having a different wavelength are made to enter an optical element under exactly the same conditions of magnification, temperature and a diameter of incident light flux, or a wavelength wherein diffraction efficiency is maximum when the optical element has a diffractive structure.

Figure 3:
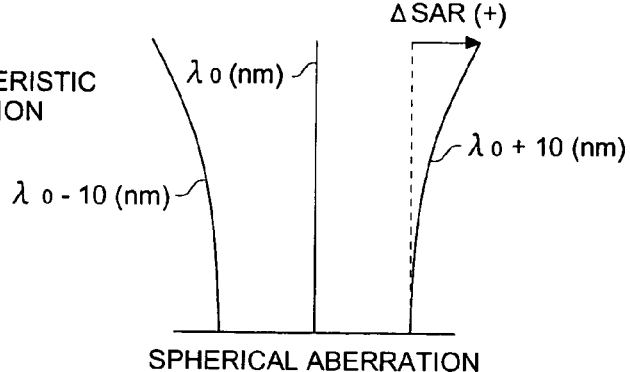
Figure 3:
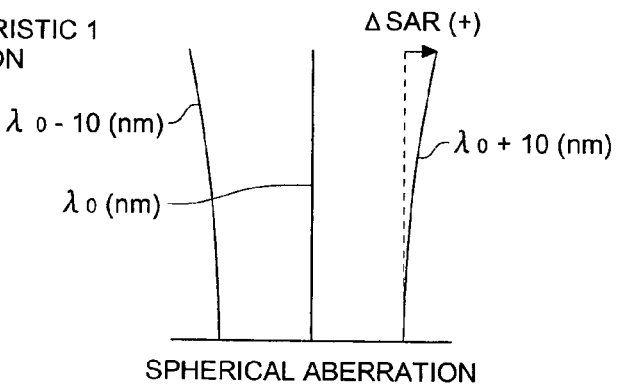
Figure 3:
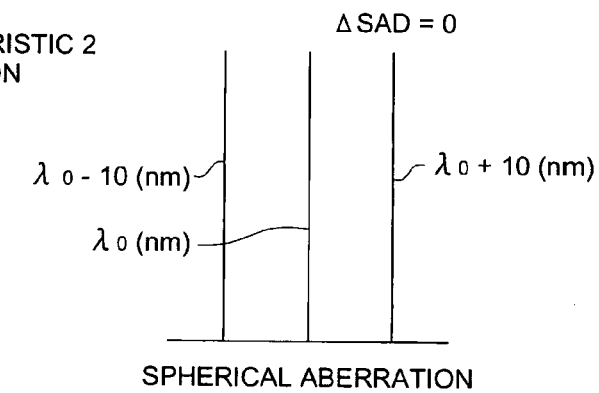
Figure 3:
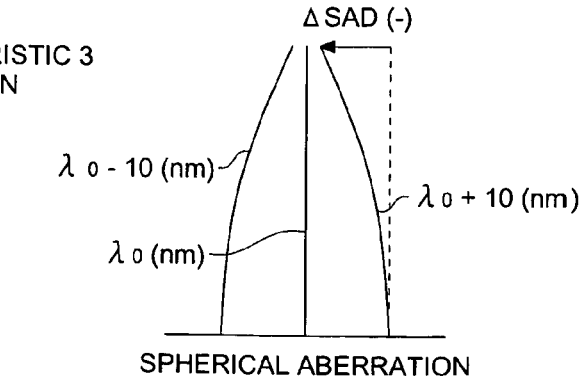

Wavelength characteristics of spherical aberration of the above-mentioned refracting lens and wavelength characteristics of spherical aberration of objective lens OBJ on which the aforesaid ring-shaped zone structure is formed are illustrated to be a spherical aberration diagram shown in FIG. 3. In this case, an amount of changes of spherical aberration for marginal light beam in the case when light with a wavelength that is longer by 10 nm than the design wavelength enters means a width between an upper end of the spherical aberration curve in the occasion where a spherical aberration curve for design wavelength $\lambda_0$ nm is moved in parallel so that its lower end may agree positionally with a lower end of a spherical aberration curve for wavelength $\lambda_0+10$ nm as shown in FIG. 3 and an upper end of a spherical aberration curve for wavelength $\lambda_0+10$ nm. Its sign is positive when spherical aberration is changed to be over, and it is negative when spherical aberration is changed to be under. Incidentally, "upper end of the spherical aberration curve", is determined by the numerical aperture on the image side of objective lens OBJ (or a refracting lens).

When chromatic aberration correcting element CA is used to be combined with the objective lens on which spherical aberration remains as shown in FIG. 3(a), spherical chromatic aberration of the combination system of the objective lens and the chromatic aberration correcting element CA grows greater than spherical chromatic aberration (FIG. 3(a)) of the objective lens itself.

In contrast to this, it is possible to control the spherical chromatic aberration of the combination system of the objective lens OBJ and the chromatic aberration correcting element CA to be relatively small, by making the objective lens OBJ to have the wavelength-dependence of spherical aberration shown in FIGS. 3(b)–3(d), with actions of the ring-shaped zone structure.

In particular, it is possible to eliminate, by means of changes in a wavelength of a semiconductor laser, the spherical aberration caused by the changes of a degree of divergence of a light flux advancing toward objective lens OBJ from the chromatic aberration correcting element CA, by providing wavelength-dependence wherein spherical aberration of marginal light beam at wavelength $\lambda_0+10$ nm is changed in the direction to be under as shown in FIG. 3(d), namely, by satisfying the following expression (2).

$$\Delta SAD<0 \qquad (2)$$

It is possible to establish spherical chromatic aberration that remains on the chromatic aberration correcting element CA to be small by making the ring-shaped zone structure of objective lens OBJ to have exclusively the actions to eliminate spherical aberration caused by changes in a degree of divergence of a light flux advancing to objective lens OBJ from the chromatic aberration correcting element CA. Therefore, even when using a violet semiconductor laser with a wavelength that is deviated by manufacture errors from design wavelength of an optical system for an optical pickup device, it is possible to control coma caused by driving for tracking of the objective lens to be small, and excellent tracking characteristics can be obtained.

In the optical system for an optical pickup device described in Item 2, a ring-shaped zone structure formed on the objective lens is a diffractive structure in which diffracting actions make adjoining ring-shaped zones to generate diffracted light at prescribed order for prescribed incident light, wherein a light-converged wave front that is formed by refracting actions and diffracting actions emerges from the objective lens.

In the optical system for an optical pickup device described in Item 3, the ring-shaped zone structure formed on the objective lens is an optical path difference providing structure that generates a prescribed optical path difference for the prescribed incident light when adjoining ring-shaped zones are formed by moving mutually on their boundary in the direction of an optical axis, wherein light-converged wave front that is formed by refracting actions emerges from the objective lens. Namely, the ring-shaped zone structure stated above may also be an optical path difference providing structure without being limited to the diffractive structure, and thereby, it is possible to provide an objective lens capable of obtaining the same effect while avoiding a decline of light transmittance caused by diffraction efficiency of the diffractive structure.

A preferable objective lens as objective lens OBJ includes one wherein a ring-shaped zone structure as a diffractive structure in which adjoining ring-shaped zones generate diffracted light at prescribed order for prescribed incident light through diffracting actions is formed on at least one optical surface, and a light-converged wave front formed by refracting actions and diffracting actions emerges from the objective lens, as illustrated in Item 2, and one wherein a ring-shaped zone structure as an optical path difference providing structure that generates a prescribed optical path difference for prescribed incident light when adjoining ring-shaped zones are formed by moving mutually in the direction of an optical axis in their boundary is formed on at least one optical surface, and a light-converged wave front formed by refracting actions emerges from the objective lens, as illustrated in Item 3.

Figures 4A, 4B:
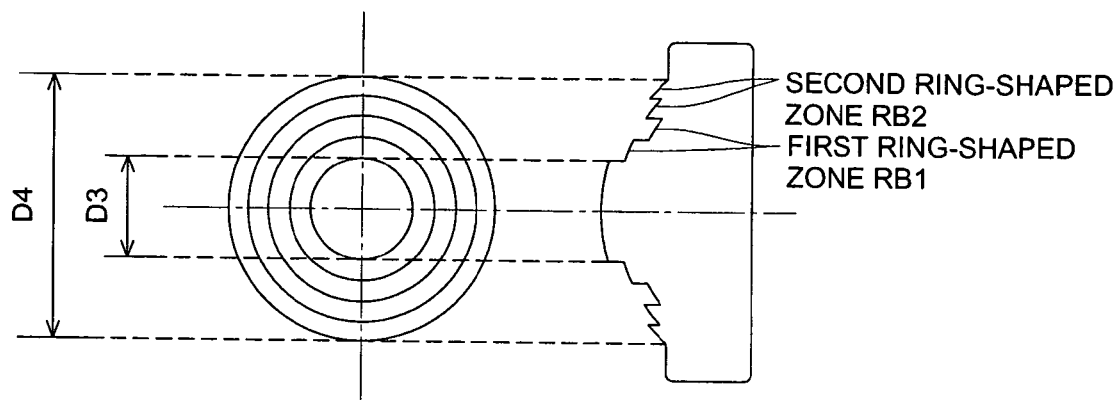

In the case of the optical system for an optical pickup device described in Item 3, in particular, as shown in FIG. 4, it is preferable that the optical system has at least one of first ring-shaped zone RB1 that is formed when an optical path length of the passing light flux moves in the direction of an optical axis in its boundary so that it may be shorter than an optical path length of a light flux passing through a ring-shaped zone adjoining the inside, and has at least one of second ring-shaped zone RB2 that is formed when an optical path length of the passing light flux moves in the direction of an optical axis in its boundary so that it may be longer than an optical path length of a light flux passing through a ring-shaped zone adjoining the inside, and the first ring-shaped zone is formed to be closer than the second ring-shaped zone to the optical axis, thus, it is possible to make the optical system to have wavelength-dependence of spherical aberration that satisfies the aforementioned expression (1).

In the optical system for an optical pickup device described in Item 4, therefore, it is characterized that the optical system has at least one of first ring-shaped zone that is formed when an optical path length of the passing light flux moves in the direction of an optical axis in its boundary so that it may be shorter than an optical path length of a light flux passing through a ring-shaped zone adjoining the inside, and has at least one of second ring-shaped zone that is formed when an optical path length of the passing light flux moves in the direction of an optical axis in its boundary so that it may be longer than an optical path length of a light flux passing through a ring-shaped zone adjoining the inside, and the first ring-shaped zone is formed to be closer than the second ring-shaped zone to the optical axis.

The optical system for an optical pickup device described in Item 5 is an optical system for an optical pickup device equipped with a chromatic aberration correcting element and an objective lens that converges a light flux coming from the chromatic aberration correcting element, wherein the chromatic aberration correcting element has, on at least one optical surface thereof, a ring-shaped zone structure that is composed of plural ring-shaped zones divided by microscopic steps and is displaced in the direction of an optical axis at its boundary so that an optical path length of a light flux passing through an outer ring-shaped zone among ring-shaped zones adjoining mutually may be longer than an optical path length of a light flux passing through the inside ring-shaped zone, and the objective lens has, on at least one optical surface thereof, a ring-shaped zone structure that is composed of plural ring-shaped zones divided by microscopic steps and is formed so that adjoining ring-shaped zones may generate diffracted light at prescribed order for the prescribed incident light, and the optical path difference added by the ring-shaped zone structure to the wave front transmitted through the objective lens is expressed by optical path difference function $\Phi_b$ defined by $$\Phi_b = b_2 \cdot h^2 + b_4 \cdot h^4 + b_6 \cdot h^6 + \quad (2)$$

(wherein, $b_2$, $b_4$ and $b_6$ are respectively coefficients of an optical path difference function of second order, fourth order and sixth order, and at least one optical path difference function coefficient including $b_4$ among $b_4$, $b_6$, . . . has a value that is not zero), as a function of height h mm from the optical axis.

When the ring-shaped zone structure is formed on an optical surface of objective lens OBJ as a diffractive structure in which mutually adjoining ring-shaped zones generate diffracted light at a prescribed order for the prescribed incident light by diffracting actions, the aforesaid technical conceptions expressed in a different expression are those described in Item 5.

Namely, it seems to be preferable that the optical path difference to be added, by a ring-shaped zone structure formed on an optical surface of the objective lens OBJ, to the wave front transmitted through objective lens OBJ is expressed by the aforementioned expression (2) as a function of height h mm from the optical axis.

If a coefficient of an optical path difference function of fourth order or more in the optical path difference function is used, it is possible to control wavelength-dependence of spherical aberration of the diffractive structure. In this case, owing to the structure of this kind for an optical surface of objective lens OBJ, it is possible to make wavelength characteristics of spherical aberration of the objective lens OBJ to be those shown in FIGS. 3(b)–3(d), when a wavelength of the light entering the diffractive structure is changed to be longer. Therefore, it is possible to control spherical aberration of the combination system of the objective lens OBJ and the chromatic aberration correcting element CA to be relatively small and to eliminate spherical aberration caused by changes in the degree of divergence of the light flux advancing from the chromatic aberration correcting element CA to the objective lens OBJ which results from changes in a wavelength of the semiconductor laser.

In the optical system for an optical pickup device described in Item 6, paraxial power $P_D$ (mm$^{-1}$) of the ring-shaped zone structure formed on the objective lens which is defined by $$P_D = -2 \cdot b_2 \quad (3')$$

satisfies the following expression.

$$-0.02 < P_D < 0.02 \quad (3)$$

The expression (3) stated above means that a function to correct the longitudinal chromatic aberration of the objective lens is hardly owned by the ring-shaped zone structure formed on an optical surface of objective lens OBJ, and is exclusively owned by the chromatic aberration correcting element CA. Due to this, a distance between adjoining ring-shaped zones on the ring-shaped zone structure formed on an optical surface of objective lens OBJ does not become too small, and thereby, it is possible to control a decline of light transmittance caused by shading of the ring-shaped zone structure that is of a microscopic form to be small, and to make manufacture of the ring-shaped zone structure of this kind to be easy.

For further achievement of the actions in the foregoing, it is preferable to make paraxial power $P_D$ of the ring-shaped zone structure formed on an optical surface of objective lens OBJ to be zero, and to prohibit the ring-shaped zone structure formed on the objective lens to have the function to correct longitudinal chromatic aberration of the objective lens.

When forming a diffractive structure that satisfies the aforesaid expressions (2), (3') and (3) on an optical surface of objective lens OBJ, the aforesaid technical conceptions expressed in a different expression are as follows.

Figures 5A, 5B, 5C:
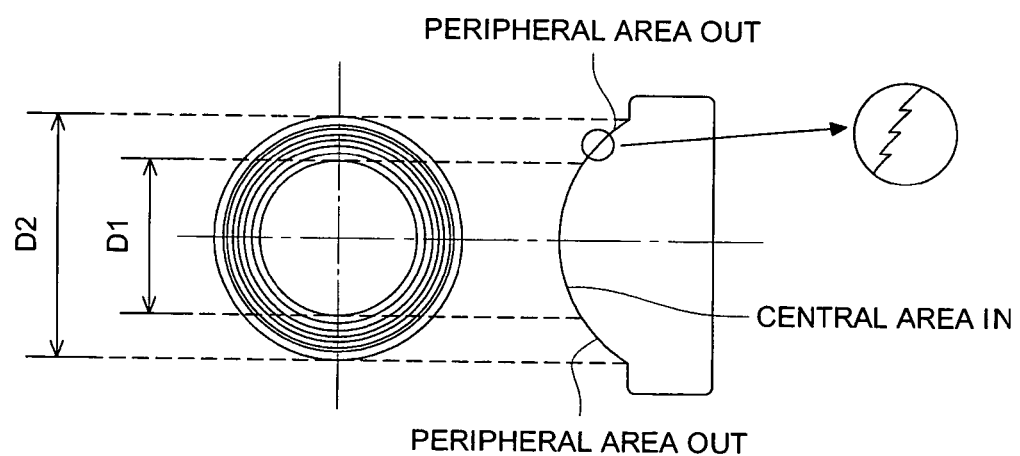
FIG. 5(a) is a front view.
FIG. 5(b) is a sectional view.
FIG. 5(c) is a partially enlarged diagram of the sectional view.

Namely, as shown in FIG. 5, the optical surface of objective lens OBJ on which a ring-shaped zone structure representing a diffractive structure is formed is divided into central area IN including an optical axis and peripheral area OUT that surrounds the circumference of the central area IN, and the central area IN is formed as a continuous surface having no step, and a ring-shaped zone structure serving as a diffractive structure is formed on the peripheral area OUT.

The optical system for an optical pickup device described in Item 7 is an optical system for an optical pickup device equipped with a chromatic aberration correcting element and an objective lens that converges a light flux coming from the chromatic aberration correcting element, wherein the chromatic aberration correcting element is composed of a plurality of ring-shaped zones divided by microscopic steps and has, on at least one optical surface thereof, a ring-shaped zone structure that is displaced in the direction of an optical axis at its boundary so that an optical path length of a light flux passing through an outer ring-shaped zone among ring-shaped zones adjoining mutually may be longer than an optical path length of a light flux passing through the inside ring-shaped zone, and the objective lens is composed of plural ring-shaped zones divided by microscopic steps and has, on at least one optical surface thereof, a ring-shaped zone structure that is formed so that adjoining ring-shaped zones may generate diffracted light at prescribed order for the prescribed incident light, and the optical surface of the objective lens on which the ring-shaped zone structure is formed is divided into a central area that includes an optical axis and is made to be the continuous surface having no step and a peripheral area that surrounds the circumference of the central area and is provided with the step.

As stated above, it is necessary to use an optical path difference function of fourth order or more in the optical path difference function for controlling wavelength-dependence of spherical aberration for the diffractive structure. Therefore, the optical path difference added to the wave front that is transmitted through objective lens OBJ is increased suddenly as a height from the optical axis grows greater. Therefore, when forming, on an optical surface of objective lens OBJ, a diffractive structure that adds the optical path difference of this kind to the transmitted wave front, a plurality of ring-shaped zonal steps are formed on an are (peripheral area OUT) where a height from the optical axis is great. By making the optical surface of the objective lens OBJ to be of the structure of this kind, wavelength characteristics of spherical aberration of the objective lens OBJ can be made to be those shown in FIGS. $3(b)$–$3(d)$. Therefore, it is possible to control spherical aberration of the combination system of the objective lens OBJ and the chromatic aberration correcting element CA to be relatively small and to eliminate spherical aberration caused by changes in the degree of divergence of the light flux advancing from the chromatic aberration correcting element CA to the objective lens OBJ which results from changes in a wavelength of the semiconductor laser.

When D1 mm represents a diameter of the central area and D2 mm represents a diameter of the maximum effective diameter of the optical surface of the objective lens on which the ring-shaped zone structure is formed, the optical pickup device described in Item 8 satisfies the following expression.

$$D1/D2>0.2 \tag{4}$$

Namely, by constructing an optical surface of the objective lens OBJ so that the expression (4) may be satisfied when D1 mm represents a diameter of central area IN and D2 mm represents a diameter of the maximum effective diameter of the optical surface of the objective lens on which the ring-shaped zone structure is formed, in FIG. 5, it is possible to eliminate effectively the spherical aberration that is caused by changes in a wavelength of a semiconductor laser and by changes in a degree of divergence of a light flux advancing from chromatic aberration correcting element CA to objective lens OBJ. For further achievement of the effects in the foregoing, it is preferable to satisfy the following expression (4').

$$D1/D2>0.3 \tag{4'}$$

Incidentally, it is more preferable to satisfy the following expression (4").

$$D1/D2>0.4 \tag{4''}$$

The optical pickup device described in Item 9 is an optical system for an optical pickup device equipped with a chromatic aberration correcting element and an objective lens that converges a light flux coming from the chromatic aberration correcting element, wherein the chromatic aberration correcting element is composed of a plurality of ring-shaped zones divided by microscopic steps and has, on at least one optical surface thereof, a ring-shaped zone structure that is displaced in the direction of an optical axis at its boundary so that an optical path length of a light flux passing through an outer ring-shaped zone among ring-shaped zones adjoining mutually may be longer than an optical path length of a light flux passing through the inside ring-shaped zone, and the objective lens is composed of plural ring-shaped zones divided by microscopic steps and has, on at least one optical surface, a ring-shaped zone structure representing an optical path difference providing structure that generates a prescribed optical path difference for a prescribed incident light when adjoining ring-shaped zones are formed to be displaced mutually in the direction of an optical axis in its boundary, and light-converging wave front formed by refracting actions emerges from the objective lens, and further, the ring-shaped zone structure formed on the objective lens has at least one of the first ring-shaped zone that is displaced in the direction of an optical axis in its boundary and formed so that an optical path length of a passing light flux may be shorter than that of the light flux passing through the ring-shaped zone adjoining the inside, and at least one of the second ring-shaped zone that is displaced in the direction of an optical axis in its boundary and formed so that an optical path length of a passing light flux may be longer than that of the light flux passing through the ring-shaped zone adjoining the inside, and the first ring-shaped zone is formed to be closer than the second ring-shaped zone to the optical axis, and the following expression is satisfied when D3 mm represents a diameter of the ring-shaped zone positioned to be closest to the optical axis and D4 mm represents a diameter of the maximum effective diameter of the optical surface of the objective lens on which the ring-shaped zone structure is formed.

$$D3/D4>0.2 \tag{5}$$

When forming a ring-shaped zone structure satisfying the expression (1) on an optical surface of objective lens OBJ as an optical path difference adding structure that generates a prescribed optical path difference for the prescribed incident light when adjoining ring-shaped zones are formed to be displaced mutually in the direction of an optical axis in the boundary, the aforesaid technical conceptions expressed in a different expression are as follows.

Namely, the ring-shaped zone structure formed on the objective lens has at least one of the first ring-shaped zone that is displaced in the direction of an optical axis in its boundary and formed so that an optical path length of a passing light flux may be shorter than that of the light flux passing through the ring-shaped zone adjoining the inside, and at least one of the second ring-shaped zone that is displaced in the direction of an optical axis in its boundary and formed so that an optical path length of a passing light flux may be longer than that of the light flux passing through the ring-shaped zone adjoining the inside, and the first ring-shaped zone is formed to be closer than the second ring-shaped zone to the optical axis, and the aforesaid expression (5) is satisfied when D3 mm represents a diameter of the ring-shaped zone positioned to be closest to the optical axis and D4 mm represents a diameter of the maximum effective diameter of the optical surface of the objective lens on which the ring-shaped zone structure is formed.

By making the optical surface of the objective lens OBJ to be of the structure of this kind, wavelength characteristics of spherical aberration of the objective lens OBJ can be made to be those shown in FIGS. 3(b)–3(d). Therefore, it is possible to control spherical aberration of the combination system of the objective lens OBJ and the chromatic aberration correcting element CA to be relatively small and to eliminate spherical aberration caused by changes in the degree of divergence of the light flux advancing from the chromatic aberration correcting element CA to the objective lens OBJ which results from changes in a wavelength of the semiconductor laser.

For further achievement of the effects in the foregoing, it is preferable to satisfy the following expression (5').

$$D3/D4 > 0.25 \quad (5')$$

If the objective lens is a single lens in the optical system for an optical pickup device described in Item 10, effects of the invention stated above can be made to be more effective.

If the numerical aperture on the image side (which is also called simply a numerical aperture) of the objective lens is made to be 0.7 or more in the optical system for an optical pickup device described in Item 11, technical effects of the invention can be made to be more effective.

When the design wavelength is made to be 500 nm or less in the optical system for an optical pickup device described in Item 12, effects of the invention can be made to be more effective.

For example, even in the case of an optical pickup device employing an objective lens having a numerical aperture that is as high as 0.7 or more, it is preferable to make the objective lens to be a single as in the past. However, spherical chromatic aberration is increased in proportion to the fourth power of the numerical aperture on the single lens, and therefore, spherical aberration remaining on the objective lens is large. For realizing a tendency to make an objective lens having a high numerical aperture to be a single lens, it is preferable to use a material having a high refractive index for securing a margin for deviation of the optical axis between optical surfaces. However, an amount of longitudinal chromatic aberration to be corrected by a chromatic aberration correcting element turns out to be large, because a material having a high refractive index is generally of low dispersion. Therefore, for correcting longitudinal chromatic aberration of the objective lens that is made of the high refractive index material of this kind, it is necessary to establish a change of a degree of divergence caused by changes in a wavelength of a semiconductor laser to be large for a light flux advancing from a chromatic aberration correcting element to the objective lens. Due to this, when using a semiconductor laser whose wavelength is deviated from a design wavelength of the optical system for an optical pickup device, a change of magnification of the objective lens turns out to be large, and an extent of occurrence of spherical aberration resulting therefrom turns out to be high.

Since objective lens OBJ of optical system OS for an optical pickup device of the invention is of the structure described in Items 1, 5, 7 and 9, it is possible to eliminate spherical aberration caused by changes of the degree of divergence of the light flux advancing from chromatic aberration correcting element CA to objective lens OBJ caused by changes in a wavelength of a semiconductor laser, and to establish spherical aberration remaining on the chromatic aberration correcting element CA to be small, even when the objective lens OBJ is made to be a single lens with a high numerical aperture and even when a design wavelength is 500 nm or less. Therefore, it is possible to control coma caused by driving for tracking of the objective lens to be small, and excellent tracking characteristics are obtained, even when using a violet semiconductor laser whose wavelength is deviated from a design wavelength of the optical system for an optical pickup device by manufacture errors.

In the optical system for an optical pickup device described in Item 13, when ΔSAD represents an amount of changes of spherical aberration of a marginal light beam on the occasion where light with a wavelength that is longer than the design wavelength by 10 nm enters the objective lens, the following expression is satisfied.

$$\Delta SAD < 0 \quad (6)$$

In the optical system for an optical pickup device described in Item 14, when ΔWFE1 represents an amount of changes of spherical aberration on the occasion where light with a wavelength that is longer than the design wavelength by 10 nm enters the objective lens through the chromatic aberration correcting element for spherical aberration on the occasion where light with the design wavelength enters the objective lens through the chromatic aberration correcting element, the following expression is satisfied.

$$|\Delta WFE1| < 0.03 \text{ } \lambda \text{ rms} \quad (7)$$

In the optical system for an optical pickup device OS having the aforesaid structure, it is preferable that ΔWFE1 representing an amount of changes of spherical aberration on the occasion where light with a wavelength that is longer than the design wavelength by 10 nm enters the objective lens OBJ through the chromatic aberration correcting element CA for spherical aberration on the occasion where light with the design wavelength enters the objective lens OBJ through the chromatic aberration correcting element CA satisfies the above expression (7).

Due to this, it is possible to make an amount of initial adjustment for a position of a collimator lens and an amount of initial adjustment for a position of a semiconductor laser to be small, even when using a semiconductor laser whose wavelength is deviated from the design wavelength of the optical system for an optical pickup device. In particular, if a value of |ΔWFE1| is made to be zero substantially, it is possible to make initial adjustment for a position of a collimator lens and initial adjustment for a position of a semiconductor laser to be unnecessary, which makes it possible to reduce manufacturing man-hour and manufacturing cost sharply.

In the objective lens OBJ having the aforesaid structure, spherical chromatic aberration is changed by actions of the ring-shaped zone structure. However, if an amount of changes for spherical chromatic aberration is established to be too great, handling of the objective lens OBJ itself is difficult. It is therefore preferable that the following expression (7') is satisfied when ΔWFE2 represents an amount of changes of spherical aberration on the occasion where light with a wavelength that is longer than the design wavelength by 10 nm enters the objective lens OBJ for spherical aberration on the occasion where light with the design wavelength enters the objective lens OBJ.

$$|\Delta WFE2| < 0.03 \text{ } \lambda \text{ rms} \quad (7')$$

By correcting spherical chromatic aberration of the combination system of the objective lens OBJ and the chromatic aberration correcting element CA to be within a range allowable in practical use, while satisfying the relationship prescribed by the expression (7'), with respect to spherical chromatic aberration of objective lens OBJ itself, it is possible to make handling of both objective lens OBJ itself and a combination system to be easy.

In the optical system for an optical pickup device described in Item 15, the ring-shaped zone structure formed on the chromatic aberration correcting element is a diffractive structure wherein a prescribed optical path difference is generated for a prescribed incident light by ring-shaped zones adjoining mutually through diffracting actions, and the chromatic aberration correcting element makes a wave front that is formed by refracting actions and diffracting actions to emerge.

In the optical system for an optical pickup device described in Item 16, when optical path difference Φb to be added to the wave front transmitted through the chromatic aberration correcting element is expressed, as a function of height h mm from the optical axis, by optical path difference function Φb defined by $$\Phi b = b_2 \cdot h^2 + b_4 \cdot h^4 + b_6 \cdot h^6 + \quad (8)$$

(where, $b_2$, $b_4$, $b_6$, ... represent respectively second, fourth, sixth, ... coefficients of optical path difference function), paraxial power $P_D$ mm$^{-1}$ of the ring-shaped zone structure defined by $$P_D = -2 \cdot b_2 \quad (9)$$

satisfies the following conditions.

$$P_D > 0 \quad (10)$$

In the optical system for an optical pickup device described in Item 17, the ring-shaped zone structure formed on the chromatic aberration correcting element is an optical path difference providing structure wherein a prescribed optical path difference is generated for a prescribed incident light when adjoining ring-shaped zones are formed to be displaced mutually in the direction of the optical axis in their boundary, and the chromatic aberration correcting element makes a wave front that is formed by refracting actions to emerge.

In addition to the chromatic aberration correcting element wherein the ring-shaped zone structure representing the diffractive structure in which a diffracted light at a prescribed order is generated for a prescribed incident light by ring-shaped zones adjoining mutually through diffracting actions, is formed on at least one optical surface, and a wave front formed by refracting actions and diffracting actions emerges, stated above, the one like that in Item 17 wherein the ring-shaped zone structure representing an optical path difference providing structure wherein a prescribed optical path difference is generated for a prescribed incident light when adjoining ring-shaped zones are formed to be displaced mutually in the direction of the optical axis in their boundary is formed on at least one optical surface, and a wave front formed by refracting actions emerges, is preferable, as chromatic aberration correcting element CA. Due to this, it is possible to provide chromatic aberration correcting element CA which can obtain the same effect while preventing a decline of light transmittance by diffraction efficiency of the diffractive structure.

In the case of the former, in this case, when optical path difference Φb to be added to the wave front transmitted through the chromatic aberration correcting element CA is expressed, as a function of height h mm from the optical axis, by optical path difference function Φb defined by the above expression (8), paraxial power $P_D$ mm$^{-1}$ of the ring-shaped zone structure formed on chromatic aberration correcting element CA to be defined by the above expression (9) satisfies the expression (10) stated above. Thereby, it is possible to make the chromatic aberration correcting element CA to have wavelength-dependence of paraxial power wherein the chromatic aberration correcting element CA is changed in the direction for the paraxial power to grow greater when a wavelength of incident light is changed to be longer, thus, longitudinal chromatic aberration of the objective lens OBJ can be corrected properly.

It is preferable that the chromatic aberration correcting element CA has a ring-shaped zone structure on each of two or more optical surfaces thereof. Due to this, an amount of correction of longitudinal chromatic aberration of the objective lens OBJ can be shared by ring-shaped zone structures on two or more optical surfaces, and thereby, a distance between adjoining ring-shaped zones can be extended. As a result, a decline of light transmittance of the chromatic aberration correcting element CA caused by errors of a form of the ring-shaped zone structure is reduced, and longitudinal chromatic aberration of the objective lens OBJ can be corrected properly.

In the optical system for an optical pickup device described in Item 18, the chromatic aberration correcting element is a coupling lens that changes an angle of divergence for an incident divergent light flux.

In the optical system for an optical pickup device described in Item 19, the chromatic aberration correcting element is an expander that changes a diameter of an incident light flux.

Figure 8B:
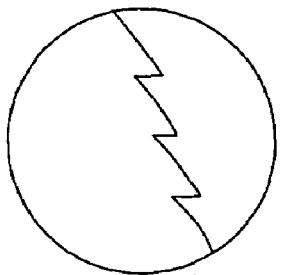
FIG. 8(b) is an enlarged view of an optical surface of an expander lens representing a chromatic aberration correcting element.
Figure 8C:
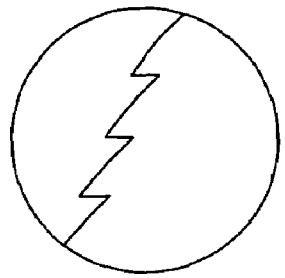
FIG. 8(c) is an enlarged view of an optical surface of an objective lens.
Figure 8A:
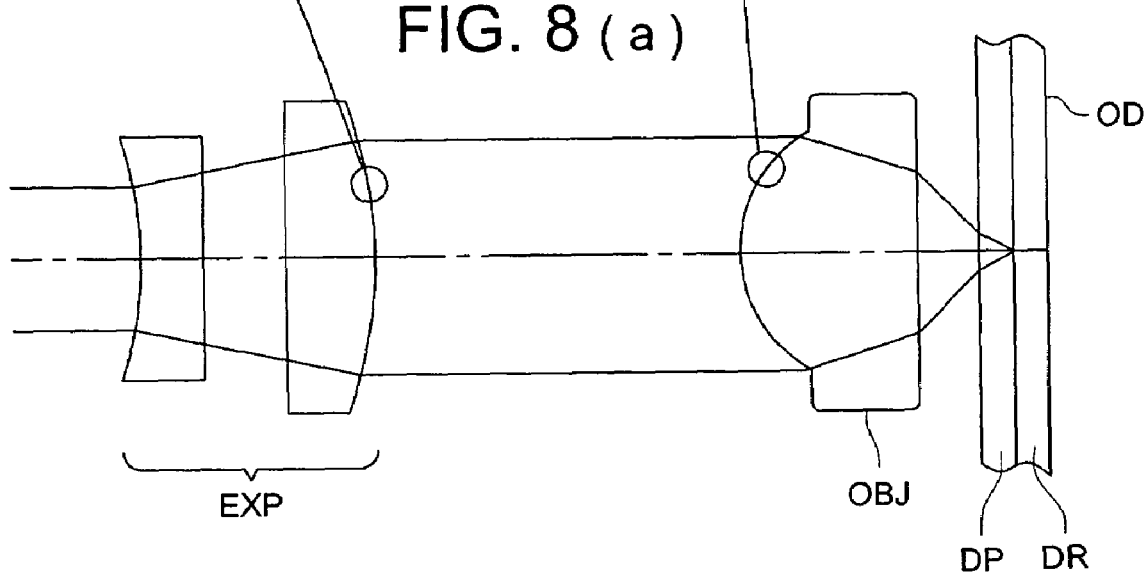
FIG. 8(a) is a sectional view of optical system OS for an optical pickup device relating to the invention.

As chromatic aberration correcting element CA capable of being applied to optical system for an optical pickup device OS, it is also possible to use coupling lens CUL that changes an angle of divergence of a divergent light flux emitted from an unillustrated violet semiconductor laser and leads it to objective lens OBJ as shown in FIG. 7, or expander lens EXP that changes a diameter of a parallel light flux collimated by an unillustrated collimator lens and leads it to objective lens OBJ as shown in FIG. 8.

Though a diffractive structure of chromatic aberration correcting element CA is formed on a flat surface of optical system for an optical pickup device OS in FIG. 1, it may also be formed on a concave surface or on a convex surface. In particular, as shown in FIG. 9, when forming that diffractive structure on the concave surface, a diameter of a light flux entering the chromatic aberration correcting element CA and a diameter of a light flux emerging from the chromatic aberration correcting element CA can be made equal substantially, when an absolute value of paraxial power of the diffractive structure expressed by the above expression (9) and that of a refraction power as a refracting interface on the concave surface are made equal substantially and their symbols are made opposite each other. In this case, when this diffractive structure is viewed on a section including the optical axis, each ring-shaped zone structure is in a shape of steps.

Though objective lens OBJ is a single lens in the explanation above, it is also possible to use an objective lens wherein a function of the ring-shaped zone structure in objective lens OBJ and a function as a light-converging lens are separated to be separate lenses (EL1 and EL2) and they are integrated solidly through fitting and adhesion of cementing portions of flanges of respective lenses as shown in FIG. 6, as an objective lens capable of being applied to the optical system for an optical pickup device OS. In this case, it is preferable to establish a radius of curvature of an optical surface to be large by making paraxial power of lens E1 having a function of a ring-shaped zone structure to be almost zero, and to make light-converging lens E2 to have exclusively a light-converging function as an objective lens. Owing to this, a decline of light transmittance caused by shading of the ring-shaped zone structure in a microscopic form can be controlled to be small, and manufacture of the ring-shaped zone structures can be made easy. Further, though lens E1 and lens E2 are integrated solidly through fitting and adhesion of cementing portions of flanges in FIG. 6, lens E1 and lens E2 may also be integrated by a separate member such as a lens barrel.

Further, if the objective lens OBJ is made to be a plastic lens, a ring-shaped zone structure that is a microscopic structure can be formed highly accurately by injection molding, which is preferable. Further, when the objective lens OBJ is made to be a glass lens, it is preferable to use glass lens whose glass transition point Tg is 400° C. or less, and to manufacture through a molding method employing a metal mold. Due to this, molding can be conducted at temperature which is lower than that for ordinary glass lens (Tg is about 530° C.) for molding, which is advantageous in terms of reduction of molding time and long life of a metal mold, resulting in realization of low cost of objective lenses. As a glass lens of this kind, there are available PG 375 (trade name) and PG 325 (trade name) made by SUMITA Optical Glass Co.

The optical pickup device described in Item 20 is one having therein a light source and an optical system for the optical pickup device that conducts recording and/or reproducing of information by converging a light flux emitted from the light source on an information recording surface of an optical information recording medium, wherein the optical system for the optical pickup device is provided with a chromatic aberration correcting element and an objective lens that converges a light flux coming from the chromatic aberration correcting element, the chromatic aberration correcting element is composed of plural ring-shaped zones divided by microscopic steps, and has, on at least one optical surface thereof, a ring-shaped zone structure displaced in the direction of an optical axis in its boundary so that an optical path length of a light flux passing through the outer ring-shaped zone among ring-shaped zones adjoining mutually may be longer than an optical path length of a light flux passing through the inner ring-shaped zone, the objective lens is composed of plural ring-shaped zones divided by microscopic steps, and has, on at least one optical surface thereof, a ring-shaped zone structure wherein ring-shaped zones adjoining mutually generate a prescribed optical path difference for a prescribed incident light, and when $\Delta SAR$ represents an amount of changes of spherical aberration of a marginal light beam in the case when light with a wavelength that is longer by 10 nm than the design wavelength for spherical aberration of marginal light beam in the case when light with the design wavelength enters a refracting lens that has the design wavelength, material, focal length, numerical aperture on the image side, magnification, lens thickness and back focus which are the same as those of the aforesaid objective lens and does not have the aforementioned ring-shaped structure, and when $\Delta SAD$ represents an amount of changes of spherical aberration of a marginal light beam in the case when light with a wavelength that is longer by 10 nm than the design wavelength for spherical aberration of a marginal light beam in the case when light with the design wavelength enters the aforesaid objective lens.

$$\Delta SAR > \Delta SAD \quad (1)$$

In the optical pickup device described in Item 21, a ring-shaped zone structure formed on the objective lens is a diffractive structure wherein diffracting actions make ring-shaped zones adjoining mutually to generate diffracted light at prescribed order for a prescribed incident light, and a light-converged wave front formed by refracting actions and diffracting actions emerges from the objective lens. Effects of the present invention are the same as those of the invention described in Item 2.

In the optical pickup device described in Item 22, a ring-shaped zone structure formed on the objective lens is an optical path difference providing structure wherein a prescribed optical path difference is generated for a prescribed incident light by ring-shaped zones adjoining mutually which are formed to be displaced mutually in the direction of an optical axis in their boundary, and a light-converged wave front formed by refracting actions emerges from the objective lens. Effects of the present invention are the same as those of the invention described in Item 3.

In the optical pickup device described in Item 23, with respect to the ring-shaped zone structure formed on the objective lens, the optical system has at least one of first ring-shaped zone that is formed when an optical path length of the passing light flux moves in the direction of an optical axis in its boundary so that it may be shorter than an optical path length of a light flux passing through a ring-shaped zone adjoining the inside, and has at least one of second ring-shaped zone that is formed when an optical path length of the passing light flux moves in the direction of an optical axis in its boundary so that it may be longer than an optical path length of a light flux passing through a ring-shaped zone adjoining the inside, and the first ring-shaped zone stated above is formed to be closer than the aforesaid second ring-shaped zone to the optical axis. Effects of the present invention are the same as those of the invention described in Item 4.

The optical pickup device described in Item 24 is one having therein a light source and an optical system for the optical pickup device that conducts recording and/or reproducing of information by converging a light flux emitted from the light source on an information recording surface of an optical information recording medium, wherein the optical system for the optical pickup device is provided with a chromatic aberration correcting element and an objective lens that converges a light flux coming from the chromatic aberration correcting element, the chromatic aberration correcting element is composed of plural ring-shaped zones divided by microscopic steps, and has, on at least one optical surface thereof, a ring-shaped zone structure displaced in the direction of an optical axis in its boundary so that an optical path length of a light flux passing through the outer ring-shaped zone among ring-shaped zones adjoining mutually may be longer than an optical path length of a light flux passing through the inner ring-shaped zone, the objective lens is composed of plural ring-shaped zones divided by microscopic steps, and has, on at least one optical surface thereof, a ring-shaped zone structure that is formed so that adjoining ring-shaped zones may generate diffracted light at prescribed order for a prescribed incident light, and the optical path difference added by the ring-shaped zone structure to the wave front transmitted through the objective lens is expressed by optical path difference function $\Phi_b$ defined by $$\Phi_b = b_2 \cdot h^2 + b_4 \cdot h^4 + b_6 \cdot h^6 + \quad (2)$$

(wherein, $b_2$, $b_4$ and $b_6$ are respectively coefficients of an optical path difference function of second order, fourth order and sixth order, and at least one optical path difference function coefficient including $b_4$ among $b_4$, $b_6$, ... has a value that is not zero), as a function of height h mm from the optical axis. Effects of the present invention are the same as those of the invention described in Item 5.

In the optical pickup device described in Item 25, paraxial power $P_D$ (mm$^{-1}$) of the ring-shaped zone structure formed on the objective lens defined by $P_D = -2 \cdot b_2$ satisfies the following expression.

$$-0.02 < P_D < 0.02 \qquad (3)$$

Effects of the present invention are the same as those of the invention described in Item 6.

The optical pickup device described in Item 26 is one having therein a light source and an optical system for the optical pickup device that conducts recording and/or reproducing of information by converging a light flux emitted from the light source on an information recording surface of an optical information recording medium, wherein the optical system for the optical pickup device is provided with a chromatic aberration correcting element and an objective lens that converges a light flux coming from the chromatic aberration correcting element, the chromatic aberration correcting element is composed of plural ring-shaped zones divided by microscopic steps, and has, on at least one optical surface thereof, a ring-shaped zone structure displaced in the direction of an optical axis in its boundary so that an optical path length of a light flux passing through the outer ring-shaped zone among ring-shaped zones adjoining mutually may be longer than an optical path length of a light flux passing through the inner ring-shaped zone, the objective lens is composed of plural ring-shaped zones divided by microscopic steps, and has, on at least one optical surface thereof, a ring-shaped zone structure that is formed so that adjoining ring-shaped zones may generate diffracted light at a prescribed order for a prescribed incident light, and an optical surface of the objective lens on which the ring-shaped zone structure is formed is divided into a central area that includes an optical axis and is continuous surface having no steps. Effects of the present invention are the same as those of the invention described in Item 7.

In the optical pickup device described in Item 27, when D1 mm represents a diameter of the central area and D2 mm represents a diameter of the maximum effective diameter of the optical surface of the objective lens on which the ring-shaped zone structure is formed, the following expression is satisfied.

$$D1/D2 > 0.2 \qquad (4)$$

Effects of the present invention are the same as those of the invention described in Item 8.

The optical pickup device described in Item 28 is one having therein a light source and an optical system for the optical pickup device that conducts recording and/or reproducing of information by converging a light flux emitted from the light source on an information recording surface of an optical information recording medium, wherein the optical system for the optical pickup device is provided with a chromatic aberration correcting element and an objective lens that converges a light flux coming from the chromatic aberration correcting element, the chromatic aberration correcting element is composed of plural ring-shaped zones divided by microscopic steps, and has, on at least one optical surface thereof, a ring-shaped zone structure displaced in the direction of an optical axis in its boundary so that an optical path length of a light flux passing through the outer ring-shaped zone among ring-shaped zones adjoining mutually may be longer than an optical path length of a light flux passing through the inner ring-shaped zone, the objective lens is composed of plural ring-shaped zones divided by microscopic steps, and has, on at least one optical surface thereof, a ring-shaped zone structure representing an optical path difference providing structure wherein adjoining ring-shaped zones are formed to be displaced mutually in the direction of an optical axis in its boundary to generate a prescribed optical path difference for a prescribed incident light, a light-converged wave front formed by refracting actions emerges from the objective lens, and further, the ring-shaped zone structure formed on the objective lens has at least one of first ring-shaped zone that is formed when an optical path length of the passing light flux moves in the direction of an optical axis in its boundary so that it may be shorter than an optical path length of a light flux passing through a ring-shaped zone adjoining the inside, and has at least one of second ring-shaped zone that is formed when an optical path length of the passing light flux moves in the direction of an optical axis in its boundary so that it may be longer than an optical path length of a light flux passing through a ring-shaped zone adjoining the inside, and the following expression is satisfied when D3 mm represents a diameter of a ring-shaped zone positioned to be closest to the optical axis and D4 mm represents a diameter of the maximum effective diameter of an optical surface of the objective lens on which the ring-shaped zone structure is formed.

$$D3/D4 > 0.2 \qquad (5)$$

Effects of the present invention are the same as those of the invention described in Item 9.

In the optical pickup device described in Item 29, the objective lens is a single lens. Effects of the present invention are the same as those of the invention described in Item 10.

In the optical pickup device described in Item 30, the numerical aperture on the image side of the objective lens is made to be 0.7 or more. Effects of the present invention are the same as those of the invention described in Item 11.

In the optical pickup device described in Item 31, the design wavelength is 500 nm or less. Effects of the present invention are the same as those of the invention described in Item 12.

In the optical pickup device described in Item 32, the following expression is satisfied when $\Delta SAD$ represents an amount of changes of spherical aberration of a marginal light beam in the case when light with a wavelength that is longer by 10 nm than the design wavelength for spherical aberration of a marginal light beam in the case when light with the design wavelength enters the aforesaid objective lens.

$$\Delta SAD < 0 \qquad (6)$$

Effects of the present invention are the same as those of the invention described in Item 13.

In the optical pickup device described in Item 33, the following expression is satisfied when $\Delta WFE\ 1$ represents an amount of changes of spherical aberration in the case when light with a wavelength that is longer by 10 nm than the design wavelength is made to enter the objective lens through the chromatic aberration correcting element for spherical aberration in the case when light with the design wavelength is made to enter the objective lens through the chromatic aberration correcting element.

$$|\Delta WFE1|<0.03 \ \lambda \ \text{rms} \tag{7}$$

Effects of the present invention are the same as those of the invention described in Item 14.

In the optical pickup device described in Item 34, the ring-shaped zone structure formed on the chromatic aberration correcting element is a diffractive structure wherein diffracting actions make ring-shaped zones adjoining mutually to generate a prescribed optical path difference for a prescribed incident light, and the chromatic aberration correcting element makes a wave front formed by refracting actions and diffracting actions to emerge. Effects of the present invention are the same as those of the invention described in Item 15.

In the optical pickup device described in Item 35, when optical path difference Φb to be added to the wave front transmitted through the chromatic aberration correcting element is expressed, as a function of height h mm from the optical axis, by optical path difference function Φb defined by $$\Phi b = b_2 \cdot h^2 + b_4 \cdot h^4 + b_6 \cdot h^6 + \tag{8}$$

(where, $b_2, b_4, b_6, \ldots$ represent respectively second, fourth, sixth, . . . coefficients of optical path difference function), paraxial power $P_D$ m$^{-1}$ of the ring-shaped zone structure defined by $$P_D = -2 \cdot b_2 \tag{9}$$

satisfies the following conditions.

$$P_D > 0 \tag{10}$$

Effects of the present invention are the same as those of the invention described in Item 16.

In the optical pickup device described in Item 36, the ring-shaped zone structure formed on the chromatic aberration correcting element is an optical path difference providing structure wherein a prescribed optical path difference is generated for a prescribed incident light when adjoining ring-shaped zones are formed to be displaced in the direction of the optical axis in their boundary, and the chromatic aberration correcting element makes a wave front that is formed by refracting actions to emerge. Effects of the present invention are the same as those of the invention described in Item 17.

In the optical pickup device described in Item 37, the chromatic aberration correcting element is a coupling lens that changes an angle of divergence for an incident divergent light flux. Effects of the present invention are the same as those of the invention described in Item 18.

In the optical pickup device described in Item 38, the chromatic aberration correcting element is an expander lens that changes a diameter of an incident light flux. Effects of the present invention are the same as those of the invention described in Item 19.

In the optical pickup device described in Item 39, the chromatic aberration correcting element is arranged to be fixed in the optical path between the light source and the objective lens, and when conducting at least one of recording and reproducing of information for the optical information recording medium, an actuator displaces the objective lens only in the direction perpendicular to the optical axis, and converges a light flux coming from the light source on the prescribed track. In this case, effects of the invention stated above can further be exhibited.

The objective lens described in Item 40 is one for an optical pickup device whose numerical aperture on the image side is 0.7 or more, wherein the objective lens is composed of plural ring-shaped zones divided by microscopic steps, and it has, on at least one optical surface, a ring-shaped zone structure that is formed so that adjoining ring-shaped zones may generate diffracted light at prescribed order for a prescribed incident light, and an optical surface of the objective lens on which the ring-shaped zone structure is formed is divided into a central area that includes an optical axis and is a continuous surface having no steps and a peripheral area that surrounds the circumference of the central area and has the steps thereon. Effects of the present invention are the same as those of the invention described in Item 11.

The objective lens described in Item 41 is one for an optical pickup device whose design wavelength is 500 nm or less, wherein the objective lens is composed of plural ring-shaped zones divided by microscopic steps and has, on at least one optical surface thereof, a ring-shaped zone structure that is formed so that adjoining ring-shaped zones may generate diffracted light at prescribed order for the prescribed incident light, and the optical surface of the objective lens on which the ring-shaped zone structure is formed is divided into a central area that includes an optical axis and is made to be the continuous surface having no step and a peripheral area that surrounds the circumference of the central area and is provided with the step. Effects of the present invention are the same as those of the invention described in Item 12.

In the objective lens described in Item 42, when D1 mm represents a diameter of the central area and D2 mm represents a diameter of the maximum effective diameter of the optical surface of the objective lens on which the ring-shaped zone structure is formed, the following expression is satisfied.

$$D1/D2 > 0.2 \tag{11}$$

Effects of the present invention are the same as those of the invention described in Item 8.

In the objective lens described in Item 43, the following expression is further satisfied.

$$D1/D2 > 0.3 \tag{12}$$

The objective lens described in Item 44 is one described in either one of Items 40–43 wherein when optical path difference Φb to be added to the wave front transmitted through the objective lens is expressed by an optical path difference function defined by $$\Phi b = b_2 \cdot h^2 + b_4 \cdot h^4 + b_6 \cdot h^6 + \tag{13}$$

as a function of height h mm from the optical axis (where, $b_2, b_4, b_6, \ldots$ represent respectively second, fourth, sixth, . . . coefficients of optical path difference function), paraxial power $P_D$ mm$^{-1}$ of the ring-shaped zone structure defined by $$P_D = -2 \cdot b_2 \tag{14}$$

satisfies the following conditions.

$$-0.02 < P_D > 0.02 \tag{15}$$

Effects of the present invention are the same as those of the invention described in Item 6.

In the objective lens described in Item 45, paraxial power $P_D$ of the ring-shaped zone structure is zero.

The objective lens described in Item 46 is one for an optical pickup device whose numerical aperture on the image side is 0.7 or more, wherein the objective lens is composed of plural ring-shaped zones divided by microscopic steps and has, on at least one optical surface, a ring-shaped zone structure representing an optical path difference providing structure that generates a prescribed optical path difference for a prescribed incident light when adjoining ring-shaped zones are formed to be displaced mutually in the direction of an optical axis in its boundary, and light-converging wave front formed by refracting actions emerges from the objective lens, and further, the ring-shaped zone structure formed on the objective lens has at least one of the first ring-shaped zone that is displaced in the direction of an optical axis in its boundary and formed so that an optical path length of a passing light flux may be shorter than that of the light flux passing through the ring-shaped zone adjoining the inside, and at least one of the second ring-shaped zone that is displaced in the direction of an optical axis in its boundary and formed so that an optical path length of a passing light flux may be longer than that of the light flux passing through the ring-shaped zone adjoining the inside, and the first ring-shaped zone is formed to be closer than the second ring-shaped zone to the optical axis, and the following expression is satisfied when D3 mm represents a diameter of the ring-shaped zone positioned to be closest to the optical axis and D4 mm represents a diameter of the maximum effective diameter of the optical surface of the objective lens on which the ring-shaped zone structure is formed.

$$D3/D4 > 0.2 \quad (16)$$

Effects of the present invention are the same as those of the invention described in Items 9 and 11.

The objective lens described in Item 47 is one for an optical pickup device whose working wavelength is 500 nm r less, wherein the objective lens is composed of plural ring-shaped zones divided by microscopic steps and has, on at least one optical surface, a ring-shaped zone structure representing an optical path difference providing structure that generates a prescribed optical path difference for a prescribed incident light when adjoining ring-shaped zones are formed to be displaced mutually in the direction of an optical axis in its boundary, and light-converging wave front formed by refracting actions emerges from the objective lens, and further, the ring-shaped zone structure formed on the objective lens has at least one of the first ring-shaped zone that is displaced in the direction of an optical axis in its boundary and formed so that an optical path length of a passing light flux may be shorter than that of the light flux passing through the ring-shaped zone adjoining the inside, and at least one of the second ring-shaped zone that is displaced in the direction of an optical axis in its boundary and formed so that an optical path length of a passing light flux may be longer than that of the light flux passing through the ring-shaped zone adjoining the inside, and the first ring-shaped zone is formed to be closer than the second ring-shaped zone to the optical axis, and the following expression is satisfied when D3 mm represents a diameter of the ring-shaped zone positioned to be closest to the optical axis and D4 mm represents a diameter of the maximum effective diameter of the optical surface of the objective lens on which the ring-shaped zone structure is formed.

$$D3/D4 > 0.2 \quad (17)$$

Effects of the present invention are the same as those of the invention described in Items 9 and 12.

In the objective lens described in Item 48, the following expression is satisfied, when ΔSAR represents an amount of changes of spherical aberration of a marginal light beam in the case when light with a wavelength that is longer by 10 nm than the design wavelength is made to enter for spherical aberration of marginal light beam in the case when light with the design wavelength enters a refracting lens that has the design wavelength, material, focal length, numerical aperture on the image side, magnification, lens thickness and back focus which are the same as those of the aforesaid objective lens and does not have the aforementioned ring-shaped structure, and when ΔSAD represents an amount of changes of spherical aberration of a marginal light beam in the case when light with a wavelength that is longer by 10 nm than the design wavelength enters for spherical aberration of a marginal light beam in the case when light with the design wavelength enters the aforesaid objective lens.

$$\Delta SAR > \Delta SAD \quad (18)$$

Effects of the present invention are the same as those of the invention described in Item 1.

The objective lens described in Item 49 is characterized to be a single lens. Effects of the present invention are the same as those of the invention described in Item 10.

The objective lens described in Item 50 is characterized to satisfy the following expression when ΔWFE 2 represents an amount of changes of a wave front aberration in the case when light with a wavelength longer by 10 nm than the design wavelength is made to enter the objective lens for a wave front aberration in the case when light with the design wavelength is made to enter the objective lens.

$$|\Delta WFE2| < 0.03\lambda \text{ rms} \quad (19)$$

Effects of the present invention have been explained above, in relation to the invention described in Item 14.

The objective lens described in Item 51 is characterized to satisfy the following expression when ΔSAD represents an amount of changes of spherical aberration of a marginal light beam in the case when light with a wavelength longer by 10 nm than the design wavelength for spherical aberration of a marginal light beam in the case when light with the design wavelength is made to enter the objective lens.

$$\Delta SAD < 0 \quad (20)$$

Effects of the present invention are the same as those of the invention described in Item 13.

Incidentally, in the present specification, the optical surface on which a diffractive structure is formed means a surface of the optical element, and for example, it means a surface which is made to have actions to diffract an incident light flux, by providing a relief on the surface of a lens, and it means an area generating diffracting actions when there are present an area generating actions and an area generating no actions on the same optical surface. The diffractive structure means an area where this diffraction is generated. As a form of the relief, there is known a form wherein ring-shaped zones in a form of concentric circles having their centers on the optical axis are formed on the surface of an optical element, for example, and each ring-shaped zone is serrated or is in a form of a step, when it is viewed on a plane including the optical axis.

In general, from an optical surface on which a diffractive structure is formed, there are generated diffracted lights of numberless orders including $0^{th}$ order, ± first order, ± second order, . . . . However, when the diffractive surface has a relief wherein the meridional section is in a serrated form, for example, it is possible to establish a form of the relief so that a diffraction efficiency for the specific order may be higher than that for the other orders, or a diffraction efficiency for one specific order (for example, + first order diffracted light) may be 100% substantially.

Incidentally, in the present specification, the wording of the objective lens means, in a narrow sense, a lens having a light-converging function that is arranged at the position closest to an optical information recording medium to face it under the condition that the optical information recording medium (optical disc) is loaded in an optical pickup device, and it means, in a broad sense, a lens that is driven by an actuator at least in the direction of an optical axis together with the aforesaid lens. In the present specification, therefore, the numerical aperture and the numerical aperture on the image side are the numerical aperture on the optical information recording medium side, and it means a numerical aperture having a diffraction finite power wherein it is possible to obtain a spot diameter necessary for conducting recording and/or reproducing information in accordance with a numerical aperture prescribed by the standard of each optical information recording medium or with a wavelength of the light source to be used for each optical information recording medium.

In the present specification, the wording of recording of information means recording of information on an information recording surface of the aforesaid optical information recording medium. Further, in the present specification, the wording of reproducing of information means reproducing of information recorded on an information recording surface of the aforementioned optical information recording medium. The objective lens of the invention may either be one used for conducting only recording or only reproducing or be one used for conducting both recording and reproducing. Further, it may either be one used for conducting recording for a certain optical information recording medium and conducting reproducing for another optical information recording medium, or be one used for conducting recording or reproducing for a certain optical information recording medium and for conducting both recording and reproducing for another optical information recording medium. Incidentally, the wording of reproducing in this case includes only reading of information.

EMBODIMENT OF THE INVENTION

Figure 10:
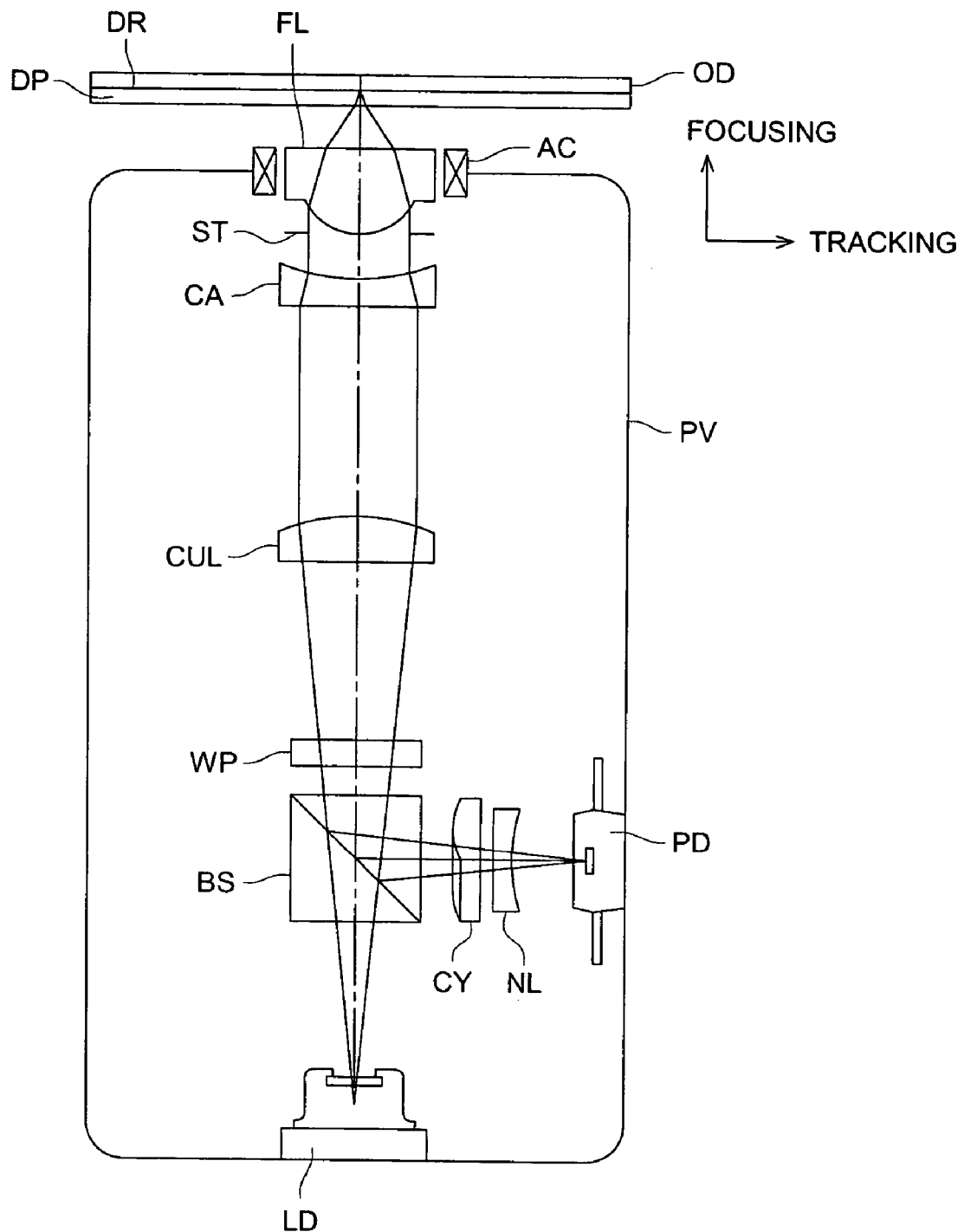
FIG. 10 is a diagram showing schematically the structure of the optical pickup device relating to the present embodiment.

An embodiment of the objective lens for an optical pickup device in the invention will be explained as follows, referring to the drawings. FIG. 10 is a schematic structure diagram of the optical pickup device including an optical pickup optical system (equipped with an objective lens) relating to the embodiment of the invention. Optical pickup device PU carrying optical pickup optical system OS relating to the invention is equipped with semiconductor laser LD serving as a light source, as shown in FIG. 10. The semiconductor laser LD is a GaN type violet semiconductor laser emitting a light flux with a wavelength of about 400 nm or an SHG violet laser. A divergent light flux emitted from the semiconductor laser LD is transmitted through polarization beam splitter BS, then passes through ¼ wavelength plate WP to become a circularly polarized light flux, and is converted into a parallel light flux by coupling lens CUL. The parallel light flux enters chromatic aberration correcting element CA. The light flux having passed the chromatic aberration correcting element CA passes through diaphragm ST, and is formed by objective lens OBJ as a light-converged spot on information recording surface DR through protective layer DP of optical disc OD. The objective lens OBJ is driven by biaxial actuator AC arranged on the circumference of the objective lens in both the focusing direction and the tracking direction. The numerical aperture on the optical disc OD side of the objective lens OBJ is made to be 0.7 or more, and the objective lens can be mounted accurately on optical pickup device PU by flange portion FL.

The reflected light flux modulated by information pits on information recording surface DR passes again through the objective lens OBJ, diaphragm ST and chromatic aberration correcting element CA, and is converted into a convergent light flux by the coupling lens CUL. The convergent light flux is converted by ¼ wavelength plate WP into a straight polarized light, then, is reflected by polarization bean splitter BS, and passes through cylindrical lens CY and concave lens NL to be given astigmatism, and is converged on a light-receiving surface of photodetector PD. Then, focus error signals and tracking error signals generated based on output signals of the photodetector PD are used to conduct recording and/or reproducing of information for optical disc OD.

An optical information recording and reproducing apparatus relating to the invention is composed of the aforementioned optical pickup device PU and an unillustrated optical information recording medium supporting means that supports the optical disc OD so that the optical pickup device can conduct recording and reproducing of information. The optical information recording medium supporting means is composed of a rotating device that holds a central portion of optical disc OD and rotates it.

In the optical pickup device PU constructed as stated above, and in the optical pickup device PU in the aforementioned optical information recording and reproducing apparatus, a ring-shaped zone structure like that described in each of Items 1, 5, 7 and 9 is formed on at least one optical surface of the chromatic aberration correcting element CA and the objective lens OBJ. Therefore, even when using semiconductor laser LD whose wavelength is deviated by manufacture errors from the design wavelength of the optical system for an optical pickup device, frequency of occurrence of spherical aberration is sufficiently small, and it is possible to control coma caused by tracking drive for the objective lens OBJ to be small, thus, excellent tracking characteristics are obtained.

EXAMPLES

Next, there will be exemplified six examples each being preferable as optical system OS for the aforesaid optical pickup device. In any example, a design wavelength is 407.5 nm, a focal length of objective lens OBJ is 1.41 mm, a numerical aperture on the image side of objective lens OBJ is 0.85 and a diameter of an entrance pupil of objective lens OBJ is 2.4 mm.

An aspheric surface in each example is expressed by the following expression Numeral 1, when X mm represents an amount of deformation from a plane that is tangential to the aspheric surface at its vertex, h mm represents a height in the direction perpendicular to the optical axis and r mm represents a radius of curvature. In the expression, κ represents a conic constant and A2i represents a coefficient of aspheric surface.

$$X = \frac{h^2/r}{1+\sqrt{1-(1+\kappa)h^2/r^2}} + \sum_{i=2}^{10} A_{2i}h^{2i} \qquad \text{Numeral 1}$$

The ring-shaped zone structure serving as a diffractive structure in each example is expressed by an optical path difference that is added by the ring-shaped zone structure to transmitted wave front. The optical path difference of this kind is expressed by optical path difference function Φb (mm) defined by the following Numeral 2, when h mm represents a height in the direction perpendicular to the optical axis and b2j represents a coefficient of a diffractive surface (which is also called a coefficient of an optical path difference function).

$$\Phi_b = \sum_{j=1}^{5} b_{2j} h^{2j}$$ Numeral 2

When forming a diffractive structure based on a value of optical path difference function Φb mm, a ring-shaped zone is formed each time the value of the optical path difference function Φb mm is changed by n times the design wavelength 407.5 nm (n is a natural number).

In the lens data table in each example, r mm represents a radius of curvature, d mm represents a distance between surfaces, Nd represents a refractive index in d line, Nλ represents a refractive index in design wavelength 407.5 nm and νd represents Abbe number in d line. Incidentally, after this (including lens data in Table), an exponent of 10 (for example, 2.5×10−3) is expressed by the use of E (for example, 2.5×E−3)

Example 1

Lens data of the optical system for an optical pickup device in Example 1 are shown in Table 1. The present example is one preferable as optical system OS for an optical pickup device shown in FIG. 1, and it is composed of objective lens OBJ and of chromatic aberration correcting element CA arranged between parallel light fluxes between the objective lens OBJ and the light source. Both of the objective lens OBJ and the chromatic aberration correcting element CA represent a plastic lens. Incidentally, the chromatic aberration correcting element CA is designed so that it may have no aberration within a diameter of 3.4 mm on its surface where a light flux emerges (Second surface in Table 1).

TABLE 1

| Surface No. | r(mm) | d(mm) | Nλ | νd | Remarks |
|---|---|---|---|---|---|
| 0 | ∞ | ∞ | | | Light source |
| 1 | ∞ | 1.0000 | 1.52432 | 56.5 | Chromatic aberration correcting element |
| 2 | 10.5793 | 5.0000 | | | |
| 3 | 0.9420 | 1.7900 | 1.55973 | 56.3 | Objective lens |
| 4 | −1.5600 | 0.3951 | | | |
| 5 | ∞ | 0.0875 | 1.61849 | 30.0 | Protective layer |
| 6 | ∞ | | | | |

Coefficient of aspheric surface

| | Second surface | Third surface | Fourth surface |
|---|---|---|---|
| κ | 2.8829E+00 | −7.0309E−01 | −4.1966E+01 |
| A4 | −3.3511E−04 | 3.0595E−02 | 4.0869E−01 |
| A6 | −7.8408E−06 | 1.9867E−02 | −1.0883E+00 |
| A8 | 0.0000E+00 | −1.6707E−02 | 1.8332E+00 |
| A10 | 0.0000E+00 | 2.8862E−02 | −2.2226E+00 |

-continued

Coefficient of aspheric surface

| | Second surface | Third surface | Fourth surface |
|---|---|---|---|
| A12 | 0.0000E+00 | −5.5567E−03 | 1.6529E+00 |
| A14 | 0.0000E+00 | −1.2747E−02 | −5.4699E−01 |
| A16 | 0.0000E+00 | 3.6292E−03 | 0.0000E+00 |
| A18 | 0.0000E+00 | 7.8493E−03 | 0.0000E+00 |
| A20 | 0.0000E+00 | −4.2883E−03 | 0.0000E+00 |

Coefficient of diffractive surface

| | First surface | Third surface |
|---|---|---|
| b2 | −2.4000E−02 | 0.0000E+00 |
| b4 | 0.0000E+00 | −2.5366E−03 |
| b6 | 0.0000E+00 | −5.8696E−04 |
| b8 | 0.0000E+00 | −2.9784E−04 |
| b10 | 0.0000E+00 | −2.7802E−04 |

Owing to the actions of the ring-shaped zone structure serving as a diffractive structure that is formed on a light flux entering surface (Third surface in Table 1), the objective lens OBJ is corrected almost perfectly in terms of spherical aberration within a range of a wavelength of 407.5±10 nm, as shown in FIG. 11(a). Due to this, occurrence of spherical aberration in the system where chromatic aberration correcting element CA is combined with the objective lens was controlled to be relatively small, as shown in FIG. 11(b). Incidentally, wave front aberration of the objective lens OBJ for wavelength 417.5 nm is 0.006 λ rms, and wave front aberration of the combined system of the chromatic aberration correcting element CA and the objective lens OBJ for wavelength 417.5 nm is 0.051 λ rms.

From FIGS. 11(a) and 11(b), it is understood that a back focus of the objective lens OBJ is longer than wavelength 417.5 nm by about 2.5 μm, but changes of a back focus for wavelength changes are corrected substantially perfectly by the combination with the chromatic aberration correcting element CA.

Further, spherical chromatic aberration remaining on the chromatic aberration correcting element CA is not more than 0.003 λ rms within a range of a wavelength of 407.5±10 nm. Therefore, coma caused by deviation of ±0.5 mm between the objective lens OBJ and the chromatic aberration correcting element CA is almost zero, for a range of a wavelength of 407.5±10 nm, and excellent tracking characteristics are obtained. Incidentally, values described in Items in the present example are as follows.

ΔSAD: 0.3 μm

ΔSAR: 1.5 μm

PD (OBJ): 0

PD (CA): 0.048

D1/D2: 0.51 (when a ring-shaped zone is formed each time optical path difference function Φb expressed by Numeral 2 is changed by one time the design wavelength 407.5 nm)

|ΔWFE 1|: 0.051 λ rms (λ (=417.5 nm) is a wavelength of light entering an optical system for an optical pickup device)

|ΔWFE 2|: 0.006 λ rms (λ (=417.5 nm) is a wavelength of light entering an optical system for an optical pickup device)

Example 2

Lens data of the optical system for an optical pickup device in Example 2 are shown in Table 2. The present example is one preferable as optical system OS for an optical pickup device shown in FIG. 1, and it is composed of objective lens OBJ and of chromatic aberration correcting element CA arranged between parallel light fluxes between the objective lens OBJ and the light source. Both of the objective lens OBJ and the chromatic aberration correcting element CA represent a plastic lens. Incidentally, the chromatic aberration correcting element CA is designed so that it may have no aberration within a diameter of 3.4 mm on its surface where a light flux emerges (Second surface in Table 2).

TABLE 2

| Surface No. | r(mm) | d(mm) | Nλ | vd | Remarks |
|---|---|---|---|---|---|
| 0 | | ∞ | | | Light source |
| 1 | ∞ | 1.0000 | 1.52432 | 56.5 | Chromatic aberration correcting element |
| 2 | 10.5793 | 5.0000 | | | |
| 3 | 0.9391 | 1.7850 | 1.55973 | 56.3 | Objective lens |
| 4 | −1.5847 | 0.3950 | | | |
| 5 | ∞ | 0.0875 | 1.61849 | 30.0 | Protective layer |
| 6 | ∞ | | | | |

Coefficient of aspheric surface

| | Second surface | Third surface | Fourth surface |
|---|---|---|---|
| κ | 2.8829E+00 | −7.0381E−01 | −4.8312E+01 |
| A4 | −3.3511E−04 | 3.1635E−02 | 4.0883E−01 |
| A6 | −7.8408E−06 | 1.9401E−02 | −1.0956E+00 |
| A8 | 0.0000E+00 | −1.7914E−02 | 1.8288E+00 |
| A10 | 0.0000E+00 | 2.8045E−02 | −2.2173E+00 |
| A12 | 0.0000E+00 | −5.8701E−03 | 1.6528E+00 |
| A14 | 0.0000E+00 | −1.2782E−02 | −5.4869E−01 |
| A16 | 0.0000E+00 | 3.6542E−03 | 0.0000E+00 |
| A18 | 0.0000E+00 | 7.8287E−03 | 0.0000E+00 |
| A20 | 0.0000E+00 | −4.3805E−03 | 0.0000E+00 |

Coefficient of diffractive surface

| | First surface | Third surface |
|---|---|---|
| b2 | −2.4000E−02 | 0.0000E+00 |
| b4 | 0.0000E+00 | −2.9894E−03 |
| b6 | 0.0000E+00 | −1.2574E−03 |
| b8 | 0.0000E+00 | −8.2790E−04 |
| b10 | 0.0000E+00 | −7.4868E−04 |

Figure 12:
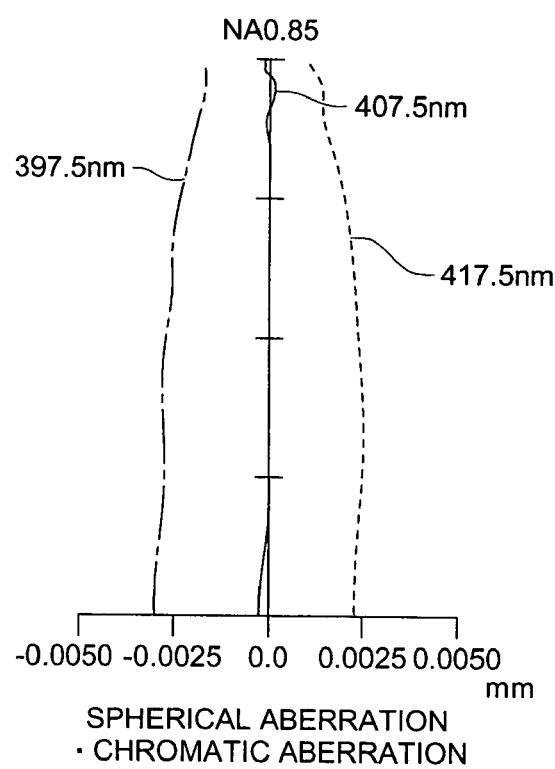
FIG. 12(a) is a diagram of spherical aberration in an objective lens of the optical system for an optical pickup device relating to Example 2.
FIG. 12(b) is a diagram of spherical aberration in the total optical system for an optical pickup device relating to Example 2.
Figure 12:
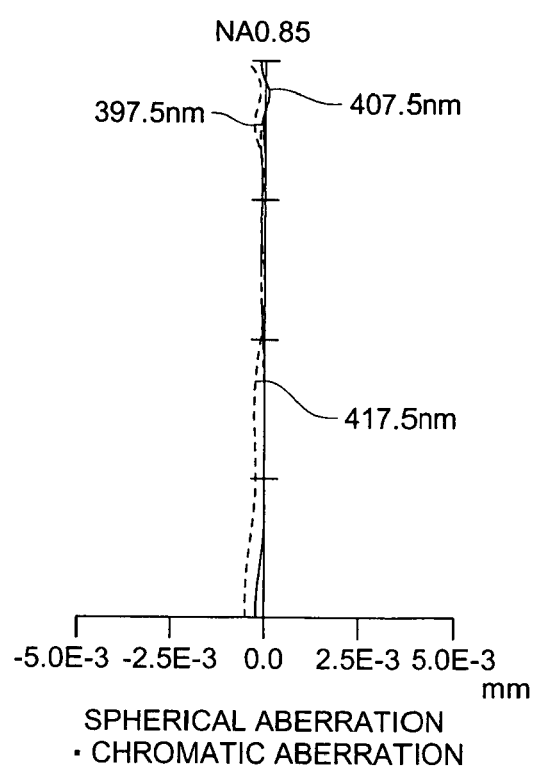

Owing to the actions of the ring-shaped zone structure serving as a diffractive structure that is formed on a light flux entering surface (Third surface in Table 2), spherical aberration of the objective lens OBJ for a wavelength of 407.5+10 nm is made to be under, as shown in FIG. 12(a). Due to this, in the system where chromatic aberration correcting element CA is combined with the objective lens, spherical aberration caused by changes in a degree of divergence of the light flux advancing to objective lens OBJ from the chromatic aberration correcting element CA resulting from the changes of a wavelength of a semiconductor laser is eliminated properly, as shown in FIG. 12(b). Incidentally, wave front aberration of the objective lens OBJ for wavelength 407.5+10 nm is 0.063 λ rms, and wave front aberration of the combined system of the chromatic aberration correcting element CA and the objective lens OBJ for wavelength 407.5+10 nm is 0.008 λ rms.

From FIGS. 12(a) and 12(b), it is understood that a back focus of the objective lens OBJ is longer than wavelength 417.5 nm by about 2.5 µm, but changes of a back focus for wavelength changes are corrected substantially perfectly by the combination with the chromatic aberration correcting element CA.

Further, spherical chromatic aberration remaining on the chromatic aberration correcting element CA is not more than 0.003 λ rms within a range of a wavelength of 407.5±10 nm. Therefore, coma caused by deviation of ±0.5 mm between the objective lens OBJ and the chromatic aberration correcting element CA is almost zero, for a range of a wavelength of 407.5±10 nm, and excellent tracking characteristics are obtained. Incidentally, values described in Items in the present example are as follows.

ΔSAD: −1.2 µm

ΔSAR: 1.4 µm

PD (OBJ): 0

PD (CA): 0.048

D1/D2: 0.49 (when a ring-shaped zone is formed each time optical path difference function Φb expressed by Numeral 2 is changed by one time the design wavelength 407.5 nm)

|ΔWFE 1|: 0.008 λ rms (λ (=417.5 nm) is a wavelength of light entering an optical system for an optical pickup device)

|ΔWFE 2|: 0.063 λ rms (λ (=417.5 nm) is a wavelength of light entering an optical system for an optical pickup device)

Example 3

Lens data of the optical system for an optical pickup device in Example 3 are shown in Table 3. The present example is one preferable as optical system OS for an optical pickup device shown in FIG. 1, and it is composed of objective lens OBJ and of chromatic aberration correcting element CA arranged between parallel light fluxes between the objective lens OBJ and the light source. The objective lens OBJ is a glass lens having glass transition point of 285° C. (PG 325 made by SUMITA Optical Glass Co.), while, the chromatic aberration correcting element CA is a plastic lens. Incidentally, the chromatic aberration correcting element CA is designed so that it may have no aberration within a diameter of 3.4 mm on its surface where a light flux emerges (Second surface in Table 3).

TABLE 3

| Surface No. | r(mm) | d(mm) | Nλ | vd | Remarks |
|---|---|---|---|---|---|
| 0 | | ∞ | | | Light source |
| 1 | ∞ | 1.0000 | 1.52432 | 56.5 | Chromatic aberration correcting element |
| 2 | 13.4542 | 5.0000 | | | |
| 3 | 0.9019 | 1.7800 | 1.51843 | 70.5 | Objective lens |
| 4 | −1.2666 | 0.4066 | | | |
| 5 | ∞ | 0.0875 | 1.61849 | 30.0 | Protective layer |
| 6 | ∞ | | | | |

| Coefficient of aspheric surface | | | |
|---|---|---|---|
| | Second surface | Third surface | Fourth surface |
| κ | 6.4831E+00 | −6.9234E−01 | −2.7895E+01 |
| A4 | −3.4669E−04 | 3.1520E−02 | 4.0664E−01 |
| A6 | −9.0390E−06 | 1.8422E−02 | −9.9835E−01 |
| A8 | 0.0000E+00 | −4.0669E−03 | 1.7165E+00 |
| A10 | 0.0000E+00 | 1.4620E−02 | −1.9142E+00 |
| A12 | 0.0000E+00 | −2.7612E−03 | 1.2168E+00 |
| A14 | 0.0000E+00 | −1.6964E−03 | −3.3248E−01 |
| A16 | 0.0000E+00 | 7.5312E−04 | 0.0000E+00 |
| A18 | 0.0000E+00 | 6.5411E−04 | 0.0000E+00 |
| A20 | 0.0000E+00 | 1.8600E−06 | 0.0000E+00 |

| Coefficient of diffractive surface | | |
|---|---|---|
| | First surface | Third surface |
| b2 | −1.9000E−02 | 0.0000E+00 |
| b4 | 0.0000E+00 | −1.8607E−03 |
| b6 | 0.0000E+00 | −6.5243E−04 |
| b8 | 0.0000E+00 | 7.0143E−04 |
| b10 | 0.0000E+00 | −9.5303E−04 |

Owing to the actions of the ring-shaped zone structure serving as a diffractive structure that is formed on a light flux entering surface (Third surface in Table 3), objective lens OBJ is corrected almost perfectly in terms of spherical chromatic aberration within a range of a wavelength of 407.5±10 nm as shown in FIG. 13(a). Due to this, occurrence of spherical chromatic aberration in the system combined with the chromatic aberration correcting element CA was controlled to be relatively small as shown in FIG. 13(b). Incidentally, wave front aberration of the objective lens OBJ for wavelength 407.5+10 nm is 0.003 λ rms, and wave front aberration of the combined system of the chromatic aberration correcting element CA and the objective lens OBJ for wavelength 407.5+10 nm is 0.041 λ rms.

From FIGS. 13(a) and 12(b), it is understood that a back focus of the objective lens OBJ is longer than wavelength 417.5 nm by about 2.0 μm, but changes of a back focus for wavelength changes are corrected substantially perfectly by the combination with the chromatic aberration correcting element CA.

Further, spherical chromatic aberration remaining on the chromatic aberration correcting element CA is not more than 0.002 λ rms within a range of a wavelength of 407.5±10 nm. Therefore, coma caused by deviation of ±0.5 mm between the objective lens OBJ and the chromatic aberration correcting element CA is almost zero, for a range of a wavelength of 407.5±10 nm, and excellent tracking characteristics are obtained. Incidentally, values described in Items in the present example are as follows.

ΔSAD: 0.0 μm
ΔSAR: 1.4 μm
PD (OBJ): 0
PD (CA): 0.038

D1/D2: 0.55 (when a ring-shaped zone is formed each time optical path difference function Φb expressed by Numeral 2 is changed by one time the design wavelength 407.5 nm)

|ΔWFE 1|: 0.041 λ rms (λ (=417.5 nm) is a wavelength of light entering an optical system for an optical pickup device)

|ΔWFE 2|: 0.003 λ rms (λ (=417.5 nm) is a wavelength of light entering an optical system for an optical pickup device)

Example 4

Lens data of the optical system for an optical pickup device in Example 4 are shown in Table 4. The present example is one preferable as optical system OS for an optical pickup device shown in FIG. 7, and it is composed of objective lens OBJ and coupling lens CUL that converts a divergent light flux emitted from the light source into a parallel light flux. Each of the objective lens OBJ and the coupling lens CUL is a plastic lens. Incidentally, the coupling lens CUL is designed so that it may have no aberration within a diameter of 3.4 mm on its surface where a light flux emerges (Second surface in Table 4).

TABLE 4

| Surface No. | r(mm) | d(mm) | Nλ | νd | Remarks |
|---|---|---|---|---|---|
| 0 | | 11.1824 | | | Light source |
| 1 | −23.7756 | 1.0000 | 1.52432 | 56.5 | Coupling lens |
| 2 | −10.7262 | 5.0000 | | | |
| 3 | 0.9391 | 1.7850 | 1.55973 | 56.3 | Objective lens |
| 4 | −1.5847 | 0.3950 | | | |
| 5 | ∞ | 0.0875 | 1.61849 | 30.0 | Protective layer |
| 6 | ∞ | | | | |

| Coefficient of aspheric surface | | | |
|---|---|---|---|
| | Second surface | Third surface | Fourth surface |
| κ | −2.2791E+00 | −7.0381E−01 | −4.8312E+01 |
| A4 | −2.1479E−04 | 3.1635E−02 | 4.0883E−01 |
| A6 | 0.0000E+00 | 1.9401E−02 | −1.0956E+00 |
| A8 | 0.0000E+00 | −1.7914E−02 | 1.8288E+00 |
| A10 | 0.0000E+00 | 2.8045E−02 | −2.2173E+00 |
| A12 | 0.0000E+00 | −5.8701E−03 | 1.6528E+00 |
| A14 | 0.0000E+00 | −1.2782E−02 | −5.4869E−01 |
| A16 | 0.0000E+00 | 3.6542E−03 | 0.0000E+00 |
| A18 | 0.0000E+00 | 7.8287E−03 | 0.0000E+00 |
| A20 | 0.0000E+00 | −4.3805E−03 | 0.0000E+00 |

| Coefficient of diffractive surface | | |
|---|---|---|
| | First surface | Third surface |
| b2 | −2.7500E−02 | 0.0000E+00 |
| b4 | −5.1181E−05 | −2.9894E−03 |
| b6 | 0.0000E+00 | −1.2574E−03 |
| b8 | 0.0000E+00 | −8.2790E−04 |
| b10 | 0.0000E+00 | −7.4868E−04 |

Owing to the actions of the ring-shaped zone structure serving as a diffractive structure that is formed on a light flux entering surface (Third surface in Table 4), spherical aberration of the objective lens OBJ for a wavelength of 407.5+10 nm is made to be under, as shown in FIG. 14(a). Due to this, in the system where coupling lens CUL is combined with the objective lens, spherical aberration caused by changes in a degree of divergence of the light flux advancing to objective lens OBJ from the coupling lens CUL resulting from the changes of a wavelength of a semiconductor laser is eliminated properly, as shown in FIG. 14(b). Incidentally, wave front aberration of the objective lens OBJ for wavelength 407.5+10 nm is 0.063 λ rms, and wave front aberration of the combined system of the coupling lens CUL and the objective lens OBJ for wavelength 407.5+10 nm is 0.012 λ rms.

From FIGS. 14(a) and 14(b), it is understood that a back focus of the objective lens OBJ is longer than wavelength 417.5 nm by about 2.5 μm, but changes of a back focus for wavelength changes are corrected substantially perfectly by the combination with the coupling lens CUL.

Further, spherical chromatic aberration remaining on the coupling lens CUL is not more than 0.001 λ rms within a range of a wavelength of 407.5±10 nm. Therefore, coma caused by deviation of ±0.5 mm between the objective lens OBJ and the coupling lens CUL is almost zero, for a range of a wavelength of 407.5±10 nm, and excellent tracking characteristics are obtained. Incidentally, values described in Items in the present example are as follows.

ΔSAD: −1.2 μm
ΔSAR: 1.4 μm
PD (OBJ): 0
PD (CA): 0.056
D1/D2: 0.49 (when a ring-shaped zone is formed each time optical path difference function Φb expressed by Numeral 2 is changed by one time the design wavelength 407.5 nm)
|ΔWFE 1|: 0.012 λ rms (λ (=417.5 nm) is a wavelength of light entering an optical system for an optical pickup device)
|ΔWFE 2|: 0.063 λ rms (λ (=417.5 nm) is a wavelength of light entering an optical system for an optical pickup device)

Example 5

Lens data of the optical system for an optical pickup device in the present example are shown in Table 5. The present example is one preferable as optical system OS for an optical pickup device shown in FIG. 8, and it is composed of objective lens OBJ and of expander lens EXP that is arranged in the parallel light flux of the light source and converts a diameter of the parallel light flux to lead it to the objective lens OBJ. Each of the objective lens OBJ and the expander lens EXP is a plastic lens. Incidentally, the expander lens EXP is designed so that it may have no aberration within a diameter of 3.4 mm on its surface where a light flux emerges (Fourth surface in Table 5).

TABLE 5

| Surface No. | r(mm) | d(mm) | Nλ | νd | Remarks |
|---|---|---|---|---|---|
| 0 | ∞ | | | | Light source |
| 1 | −9.4493 | 0.8000 | 1.52432 | 56.5 | Expander lens |
| 2 | 19.1557 | 1.5974 | | | |
| 3 | ∞ | 1.0000 | 1.52432 | 56.5 | |
| 4 | −25.4925 | 5.0000 | | | |
| 5 | 0.9391 | 1.7850 | 1.55973 | 56.3 | Objective lens |
| 6 | −1.5847 | 0.3950 | | | |
| 7 | ∞ | 0.0875 | 1.61849 | 30.0 | Protective layer |
| 8 | ∞ | | | | |

| | Coefficient of aspheric surface | | | | |
|---|---|---|---|---|---|
| | First surface | Second surface | Fourth surface | Fifth surface | Sixth surface |
| κ | −1.8278E−01 | −4.6236E+00 | −4.7427E−01 | −7.0381E−01 | −4.8312E+01 |
| A4 | 2.8554E−05 | −6.4537E−05 | 0.0000E+00 | 3.1635E−02 | 4.0883E−01 |
| A6 | 1.1789E−05 | 9.4710E−06 | 0.0000E+00 | 1.9401E−02 | −1.0956E+00 |
| A8 | 0.0000E+00 | 0.0000E+00 | 0.0000E+00 | −1.7914E−02 | 1.8288E+00 |
| A10 | 0.0000E+00 | 0.0000E+00 | 0.0000E+00 | 2.8045E−02 | −2.2173E+00 |
| A12 | 0.0000E+00 | 0.0000E+00 | 0.0000E+00 | −5.8701E−03 | 1.6528E+00 |
| A14 | 0.0000E+00 | 0.0000E+00 | 0.0000E+00 | −1.2782E−02 | −5.4869E−01 |
| A16 | 0.0000E+00 | 0.0000E+00 | 0.0000E+00 | 3.6542E−03 | 0.0000E+00 |
| A18 | 0.0000E+00 | 0.0000E+00 | 0.0000E+00 | 7.8287E−03 | 0.0000E+00 |
| A20 | 0.0000E+00 | 0.0000E+00 | 0.0000E+00 | −4.3805E−03 | 0.0000E+00 |

| | Coefficient of diffractive surface | | |
|---|---|---|---|
| | Third surface | Fourth surface | Fifth surface |
| b2 | −1.2677E−02 | −1.2322E−02 | 0.0000E+00 |
| b4 | 0.0000E+00 | 0.0000E+00 | −2.9894E−03 |
| b6 | 0.0000E+00 | 0.0000E+00 | −1.2574E−03 |
| b8 | 0.0000E+00 | 0.0000E+00 | −8.2790E−04 |
| b10 | 0.0000E+00 | 0.0000E+00 | −7.4868E−04 |

Figure 15:
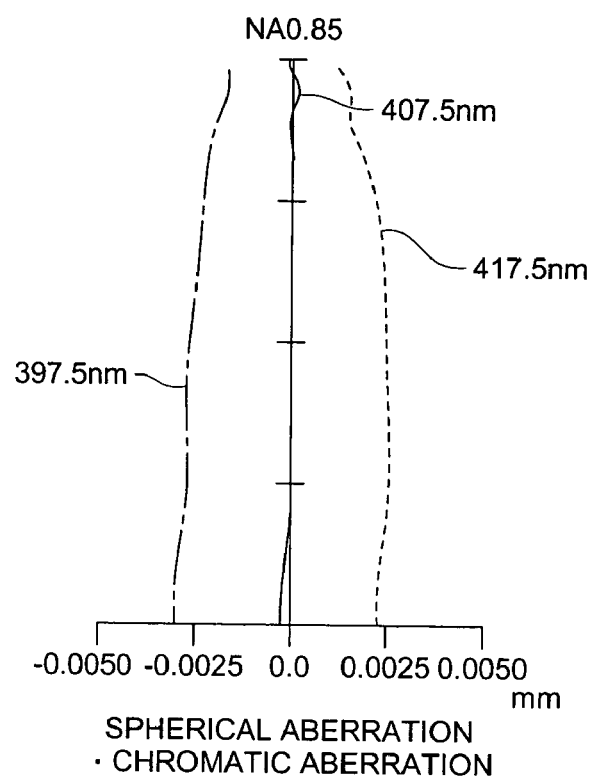
FIG. 15(a) is a diagram of spherical aberration in an objective lens of the optical system for an optical pickup device relating to Example 5.
FIG. 15(b) is a diagram of spherical aberration in the total optical system for an optical pickup device relating to Example 5.
Figure 15:
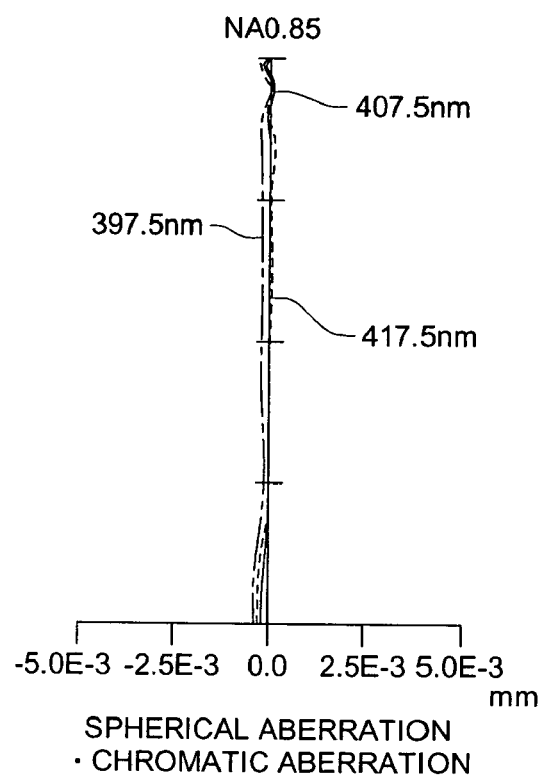

Owing to the actions of the ring-shaped zone structure serving as a diffractive structure that is formed on a light flux entering surface (Fifth surface in Table 5), spherical aberration of the objective lens OBJ for a wavelength of 407.5+10 nm is made to be under, as shown in FIG. 15(a). Due to this, in the system where expander lens EXP is combined with the objective lens, spherical aberration caused by changes in a degree of divergence of the light flux advancing to objective lens OBJ from the expander lens EXP resulting from the changes of a wavelength of a semiconductor laser is eliminated properly, as shown in FIG. 15(b). Incidentally, wave front aberration of the objective lens OBJ for wavelength 407.5+10 nm is 0.063 λ rms, and wave front aberration of the combined system of the expander lens EXP and the objective lens OBJ for wavelength 407.5+10 nm is 0.011 λ rms.

From FIGS. 15(a) and 15(b), it is understood that a back focus of the objective lens OBJ is longer than wavelength 417.5 nm by about 2.5 μm, but changes of a back focus for wavelength changes are corrected substantially perfectly by the combination with the expander lens EXP.

Further, spherical chromatic aberration remaining on the expander lens EXP is not more than 0.002 λ rms within a range of a wavelength of 407.5±10 nm. Therefore, coma caused by deviation of ±0.5 mm between the objective lens OBJ and the expander lens EXP is almost zero, for a range of a wavelength of 407.5±10 nm, and excellent tracking characteristics are obtained. Incidentally, values described in Items in the present example are as follows.

ΔSAD: −1.2 μm
ΔSAR: 1.4 μm
PD (OBJ): 0
PD (CA): 0.050
D1/D2: 0.49 (when a ring-shaped zone is formed each time optical path difference function Φb expressed by Numeral 2 is changed by one time the design wavelength 407.5 nm)
|ΔWFE 1|: 0.011 λ rms (λ (=417.5 nm) is a wavelength of light entering an optical system for an optical pickup device)
|ΔWFE 2|: 0.063 λ rms (λ (=417.5 nm) is a wavelength of light entering an optical system for an optical pickup device)

Incidentally, when the ring-shaped zone structure serving as a diffractive structure whose optical path difference function is expressed by Numeral 2 is formed on each of two or more optical surfaces of the chromatic aberration correcting element, as in the present example, the paraxial power of the ring-shaped zone structure in the present specification is the sum of paraxial power PD (mm$^{-1}$) of the ring-shaped zone structure on each optical surface calculated by expression (9).

Example 6

Lens data of the optical system for an optical pickup device in Example 6 are shown in Table 6. The present example is represented by optical system OS for an optical pickup device wherein an optical element on which an optical path difference providing structure is formed as shown in FIG. 4 is used in place of objective lens OBJ of optical system OS for an optical pickup device shown in FIG. 1. The optical system OS for an optical pickup device is composed of objective lens OBJ and chromatic aberration correcting elements CA arranged in the objective lens OBJ and a parallel light flux from a light source. Each of the objective lens OBJ and chromatic aberration correcting element CA is designed so that it may have no aberration within a diameter of 3.4 mm on its surface where a light flux emerges (second surface in Table 6).

TABLE 6-1

| Surface No. | r(mm) | d(mm) | Nλ | vd | Remarks |
|---|---|---|---|---|---|
| 0 |  | ∞ |  |  | Light source |
| 1 | ∞ | 1.0000 | 1.52432 | 56.5 | Chromatic aberration correcting element |
| 2 | 10.5793 | 5.0000 |  |  |  |
| 3 | (Mentioned below) | (Mentioned below) | 1.55973 | 56.3 | Objective lens |
| 4 | −1.5384 | 0.3997 |  |  |  |
| 5 | ∞ | 0.0875 | 1.61849 | 30.0 | Protective layer |
| 6 | ∞ |  |  |  |  |

Paraxial radius of curvature of each ring-shaped zone, axial thickness and aspheric surface coefficient on third surface

| Ring-shaped zone number | Third surface | | | | |
|---|---|---|---|---|---|
|  | 1 | 2 | 3 | 4 | 5 |
| r(mm) | 9.4639E−01 | 9.4503E−01 | 9.4335E−01 | 9.4536E−01 | 9.46791E−01 |
| d3 | 1.79000 | 1.78636 | 1.78277 | 1.78652 | 1.79000 |
| κ | −6.9759E−01 | −6.9169E−01 | −6.9133E−01 | −6.9903E−01 | −6.9820E−01 |
| A4 | 3.2277E−02 | 3.1350E−02 | 3.1187E−02 | 3.3255E−02 | 3.2699E−02 |
| A6 | 2.1208E−02 | 2.1208E−02 | 2.1208E−02 | 2.1208E−02 | 2.1208E−02 |
| A8 | −1.6654E−02 | −1.6654E−02 | −1.6654E−02 | −1.6654E−02 | −1.6654E−02 |
| A10 | 2.9526E−02 | 2.9526E−02 | 2.9526E−02 | 2.9526E−02 | 2.9526E−02 |
| A12 | −5.4275E−03 | −5.4275E−03 | −5.4275E−03 | −5.4275E−03 | −5.4275E−03 |
| A14 | −1.2613E−02 | −1.2613E−02 | −1.2613E−02 | −1.2613E−02 | −1.2613E−02 |
| A16 | 3.5578E−03 | 3.5578E−03 | 3.5578E−03 | 3.5578E−03 | 3.5578E−03 |
| A18 | 7.8233E−03 | 7.8233E−03 | 7.8233E−03 | 7.8233E−03 | 7.8233E−03 |
| A20 | −4.2933E−03 | −4.2933E−03 | −4.2933E−03 | −4.2933E−03 | −4.2933E−03 |

TABLE 6-2

Radius of inner circumference and radius of outer circumference of each ring-shaped zone on third surface
Third surface

| Ring-shaped zone number | Radius of inner circumference (mm) | Radius of outer circumference (mm) |
|---|---|---|
| 1 | 0.000 | 0.440 |
| 2 | 0.440 | 0.670 |
| 3 | 0.670 | 1.060 |
| 4 | 1.060 | 1.130 |
| 5 | 1.130 | 1.200 |

Aspheric surface coefficient

| | Second surface | Fourth surface |
|---|---|---|
| κ | 2.8829E+00 | −3.6346E+01 |
| A4 | −3.3511E−04 | 4.0487E−01 |
| A6 | −7.8408E−06 | −1.0890E+00 |
| A8 | 0.0000E+00 | 1.8496E+00 |
| A10 | 0.0000E+00 | −2.2344E+00 |
| A12 | 0.0000E+00 | 1.6531E+00 |
| A14 | 0.0000E+00 | −5.4726E−01 |

Diffraction surface coefficient

| | First surface |
|---|---|
| b2 | −2.4000E−02 |
| b4 | 0.0000E+00 |
| b6 | 0.0000E+00 |
| b8 | 0.0000E+00 |
| b18 | 0.0000E+00 |

In the objective lens OBJ, spherical aberration is caused in the under-corrected direction at a wavelength of 417.5 nm as shown in FIG. 16(a), by an effect of a ring-shaped zonal structure serving as a phase difference providing structure formed on a light flux entering surface (the third surface in 6-1), and wavefront aberration in that case is 0.054 λ rms. When chromatic aberration correcting elements CA is combined with the foregoing, an emerging light turns out to be a converged light and spherical aberration is caused in the over-corrected direction in the objective lens OBJ by an effect of a ring-shaped zonal structure serving as a diffractive structure formed on a light flux entering surface (the first surface in Table 6-1) of the chromatic aberration correcting elements CA. However, this is balanced with occurrence of spherical chromatic aberration on objective lens OBJ in the under-corrected direction caused by an effect of a ring-shaped zonal structure serving as a phase difference providing structure, and thereby, it was possible to control occurrence of spherical chromatic aberration to be less, as shown in FIG. 16(b). Incidentally, wavefront aberration of a compound system of the chromatic aberration correcting elements CA and objective lens OBJ for wavelength 417.5 mm is 0.014 λ rms.

Further, FIG. 17(a) shows wavefront aberration including defocus components that is caused when a light flux with wavelength 408.5 nm enters objective lens OBJ, while, FIG. 17(b) shows wavefront aberration including defocus components that is caused when light with wavelength 408.5 nm enters a compound system of the chromatic aberration correcting elements CA and objective lens OBJ. FIGS. 17(a) and 17(b) show that defocus components of objective lens OBJ caused by changes in a wavelength of an incident light flux are corrected properly by an effect of a ring-shaped zonal structure serving as a diffractive structure of the chromatic aberration correcting elements CA.

Further, spherical chromatic aberration remaining on the chromatic aberration correcting elements CA is 0.002 λ rms or less in a wavelength range of 407.5±10 nm. Therefore, coma caused by the deviation of optical axis of 0.5 mm between objective lens OBJ and the chromatic aberration correcting elements CA is substantially zero, and excellent tracking characteristics are obtained.

Incidentally, values described in Item in the present example are as follows.

PD (CA): 0.048

D3/D4: 0.4

|ΔWFE1|: 0.014 λ rms (on condition that λ (=417.5 nm) is a wavelength of light entering an optical system for an optical pickup device)

|ΔWFE2|: 0.054 λ rms (on condition that λ (=417.5 nm) is a wavelength of light entering an optical system for an optical pickup device)

EFFECTS OF THE INVENTION

The invention makes it possible to provide an optical system for an optical pickup device that is housed in the optical pickup device employing a violet light source having a short wavelength, wherein, when a wavelength of an incident light is changed, frequency of occurrence of coma is sufficiently small, and further, even when the objective lens is decentered for the chromatic aberration correcting element in the direction perpendicular to the optical axis when a wavelength of the incident light is changed, frequency of occurrence of spherical aberration is sufficiently small. It is further possible to provide an objective lens capable of being applied to the optical system of the optical pickup device and the optical pickup device in which the optical system for the optical pickup device and the objective lens are housed.

What is claimed is:

1. An optical system for use in an optical pickup apparatus, comprising:

a chromatic aberration correcting element having a ring-shaped zonal structure including plural ring-shaped zones on at least one optical surface thereof in which neighboring ring-shaped zones are divided with a stepped section in such a way that one of the neighboring ring-shaped zones located apart from the optical axis has a longer optical path than the other one located closer to the optical axis, and an objective lens to converge a light flux from the chromatic aberration correcting element onto an information recording plane of an optical disk and having a ring-shaped zonal structure including plural ring-shaped zones on at least one optical surface thereof in which neighboring ring-shaped zones are divided with a stepped section shaped in the optical axis direction in such a way that the stepped section causes a optical path difference between light fluxes having passed through the neighboring ring-shaped zones;

wherein the ring-shaped zonal structure of the chromatic aberration correcting element corrects a deviation of a focal point caused by the objective lens due to a wavelength fluctuation of an incident light flux coming into the optical system; and the ring-shaped zonal structure of the objective lens corrects a spherical aberration caused by the objective lens due to a wavelength fluctuation of an incident light flux coming into the optical system.

2. The optical system of claim 1, wherein the ring-shaped zonal structure of the objective lens corrects at least one of a spherical aberration caused by a magnification fluctuation of the objective lens due to a wavelength fluctuation of an incident light flux coming into the optical system and a spherical aberration caused by the wavelength dispersion of the objective lens due to a wavelength fluctuation of an incident light flux coming into the optical system.

3. The optical system of claim 1, wherein the width of a ring-shaped zone in the ring-shaped zonal structure of the objective lens is changed periodically as the ring-shaped zone is located apart from the optical axis and the ring-shaped zonal structure is a diffractive structure in which each stepped section is shaped in the same direction.

4. The optical system of claim 3, wherein when the optical path difference provided by the ring-shaped zonal structure to a wavefront passing through the objective lens is represented by an optical path difference function $\Phi_b$ defined by the formula of ($\Phi_b = b_2 \cdot h^2 + b_4 \cdot h^4 + b_6 \cdot h^6 + \ldots$) as a function of a height h (mm) from the optical axis (where $b_2$, $b_4$, $b_6$ are second, fourth, sixth order optical path difference function coefficients respectively), at least one optical path difference function coefficient including fourth order optical path difference function coefficient among high order optical path difference function coefficients of fourth order or more has a value other than zero.

5. The optical system of claim 4, wherein the following formula is satisfied:

$$-0.02 < P_D < 0.02$$

$$P_D = -2 \cdot b_2$$

Where $P_D$ is the paraxial power ($mm^{-1}$) of the ring-shaped zonal structure formed on the objective lens.

6. The optical system of claim 5, wherein $P_D = 0$.

7. The optical system of claim 3, wherein the optical surface of the objective lens on which the ring-shaped zonal structure is formed includes a central region and a peripheral region, the central region includes the optical axis and is a continuous surface having no stepped section and the peripheral region encloses the periphery of the central region and has the stepped sections.

8. The optical system of claim 7, wherein the following formula is satisfied:

$$D1/D2 > 0.2$$

where D1 is the diameter of the central region, and
D2 is the maximum effective diameter of the optical surface on which the ring-shaped zonal structure is formed.

9. The optical system of claim 1, wherein the width of a ring-shaped zone in the ring-shaped zonal structure of the objective lens is changed non-periodically as the ring-shaped zone is located apart from the optical axis and the ring-shaped zonal structure is an optical path difference providing structure in which the shaping direction of the stepped section is reversed in the effective diameter of the objective lens.

10. The optical system of claim 9, wherein in the ring-shaped zonal structure, a ring-shaped zone neighboring to the outside of a ring-shaped zone including the optical axis is displaced in the optical axis direction so as to have a shorter optical path length than the ring-shaped zone including the optical axis, a ring-shaped zone located at the point of the maximum effective diameter is displaced in the optical axis direction so as to have a longer optical path length than a ring-shaped zone neighboring to an inside of the ring-shaped zone located at the point of the maximum effective diameter, and a ring-shaped zone located at the point of 75% of the maximum effective diameter is displace in the optical axis direction so as to have a shorter optical path length that each of ring-shaped zones neighboring to the outside and inside of the ring-shaped zone located at the point of 75% of the maximum effective diameter.

11. The optical system of claim 9, wherein the following formula is satisfied:

$$D3/D4 > 0.2$$

where D3 is the diameter (mm) of the ring-shaped zone including the optical axis, and
D4 is the maximum effective diameter (mm) of the optical surface of the objective lens.

12. The optical system of claim 1, wherein the following formula is satisfied:

$$\Delta SAR > \Delta SAD$$

where, when it is defined that a refractive lens has not the ring-shaped zonal structure and has the same design wavelength, the same material, the same focal length, the same image-side numerical aperture, the same magnification, the same lens thickness and the same back focus as those of the objective lens, $\Delta SAR$ is a change amount of the spherical aberration of a marginal ray when a light flux having a wavelength longer by 10 nm than the design wavelength comes into the refractive lens, for the spherical aberration of a marginal ray when a light flux having the design wavelength comes into the refractive lens, and $\Delta SAD$ is a change amount of the spherical aberration of a marginal ray when a light flux having a wavelength longer by 10 nm than the design wavelength comes into the objective lens, for the spherical aberration of a marginal ray when a light flux having the design wavelength comes into the objective lens.

13. The optical system of claim 1, wherein the following formula is satisfied:

$$\Delta SAD < 0$$

where $\Delta SAD$ is a change amount of the spherical aberration of a marginal ray when a light flux having a wavelength longer by 10 nm than the design wavelength comes into the objective lens, for the spherical aberration of a marginal ray when a light flux having the design wavelength comes into the objective lens.

14. The optical system of claim 1, wherein the following formula is satisfied:

$$|\Delta WFE1| < 0.03 \, \lambda \, \text{rms}$$

where $\Delta WFE1$ is a change amount of a wavefront aberration when a light flux having a wavelength longer by 10 nm than the design wavelength comes through the chromatic aberration correcting element into the objective lens, for a wavefront aberration when a light flux having the design wavelength comes through the chromatic aberration correcting element into the objective lens.

15. The optical system of claim 1, wherein the objective lens is a single lens.

16. The optical system of claim 1, wherein the objective lens is composed of a diffractive element having the optical surface on which the ring-shaped structure is formed and a converging element to converge a light flux having passed the diffractive element, and the following formula is satisfied:

$$|P2/P1|<0.2$$

where P1 is a paraxial power (mm$^{-1}$) of the diffractive element, and P2 is a paraxial power (mm$^{-1}$) of the converging element.

17. The optical system of claim 1, wherein the objective lens has an image-side numerical aperture of 0.7 or more.

18. The optical system of claim 1, wherein the design wavelength is 500 nm or less.

19. The optical system of claim 1, wherein the ring-shaped zonal structure of the chromatic aberration correcting element is a diffractive structure in which the width of a ring-shaped zone is periodically decreased as the ring-shaped zone is placed apart from the optical axis.

20. The optical system of claim 19, wherein when the optical path difference $\Phi_b$ provided to a wavefront passing through the chromatic aberration correcting element is represented by an optical path difference function $\Phi_b$ defined by the formula of ($\Phi_b = b_2 \cdot h^2 + b_4 \cdot h^4 + b_6 \cdot h^6 + \ldots$) as a function of a height h (mm) from the optical axis (where $b_2$, $b_4$, $b_6$ are second, fourth, sixth order optical path difference function coefficients respectively), the following formula is satisfied:

$$P_D > 0$$

where $P_D$ is a paraxial power (mm$^{-1}$) of the ring-shaped zonal structure.

21. The optical system of claim 20, wherein all of high order optical path difference function coefficients not less than fourth order in the optical path difference function $\Phi_b$ are zero.

22. The optical system of claim 1, wherein the ring-shaped zonal structure of the chromatic aberration correcting element is a optical path difference proving structure in which the width of a ring-shaped zone is changed non-periodically as the ring-shaped zone is located apart from the optical axis.

23. The optical system of claim 1, wherein the chromatic aberration correcting element is a coupling lens to convert a divergent angle of a divergent light flux emitted from a light source into an almost parallel light flux.

24. The optical system of claim 1, wherein the optical pickup apparatus comprises a coupling lens to convert a divergent angle of a divergent light flux emitted from a light source into an almost parallel light flux and the chromatic aberration correcting element is an expander lens of two lens groups provided on an optical path between the coupling lens and the objective lens.

25. The optical system of claim 1, wherein the optical pickup apparatus comprises a coupling lens to convert a divergent angle of a divergent light flux emitted from a light source into an almost parallel light flux and the chromatic aberration correcting element is an optical element of one lens group provided on an optical path between the coupling lens and the objective lens.

26. An optical pickup apparatus, comprising:
a light source; and
an optical system to converge a light flux from the light source onto an information recording plane of the optical information recording medium so as to conduct recording and/or reproducing information;
the optical system comprising:

a chromatic aberration correcting element having a ring-shaped zonal structure including plural ring-shaped zones on at least one optical surface thereof in which neighboring ring-shaped zones are divided with a stepped section in such a way that one of the neighboring ring-shaped zones located apart from the optical axis has a longer optical path than the other one located closer to the optical axis, and an objective lens to converge a light flux from the chromatic aberration correcting element onto an information recording plane of an optical disk and having a ring-shaped zonal structure including plural ring-shaped zones on at least one optical surface thereof in which neighboring ring shaped zones are divided with a stepped section shaped in the optical axis direction in such a way that the stepped section causes a optical path difference between light fluxes having passed through the neighboring ring-shaped zones;

wherein the ring-shaped zonal structure of the chromatic aberration correcting element corrects a deviation of a focal point caused by the objective lens due to a wavelength fluctuation of an incident light flux coming into the optical system; and the ring-shaped zonal structure of the objective lens corrects a spherical aberration caused by the objective lens due to a wavelength fluctuation of an incident light flux coming into the optical system.

27. The optical pickup apparatus of claim 26, wherein the ring-shaped zonal structure of the objective lens corrects at least one of a spherical aberration caused by a magnification fluctuation of the objective lens due to a wavelength fluctuation of an incident light flux coming into the optical system and a spherical aberration caused by the wavelength dispersion of the objective lens due to a wavelength fluctuation of an incident light flux coming into the optical system.

28. The optical pickup apparatus of claim 26, wherein the width of a ring-shaped zone in the ring-shaped zonal structure of the objective lens is changed periodically as the ring-shaped zone is located apart from the optical axis and the ring-shaped zonal structure is a diffractive structure in which each stepped section is shaped in the same direction.

29. The optical pickup apparatus of claim 28, wherein when the optical path difference provided by the ring-shaped zonal structure to a wavefront passing through the objective lens is represented by an optical path difference function $\Phi_b$ defined by the formula of ($\Phi_b = b_2 \cdot h^2 + b_4 \cdot h^4 + b_6 \cdot h^6 + \ldots$) as a function of a height h (mm) from the optical axis (where $b_2$, $b_4$, $b_6$ are second, fourth, sixth order optical path difference function coefficients respectively), at least one optical path difference function coefficient including fourth order optical path difference function coefficient among high order optical path difference function coefficients of fourth order or more has a value other than zero.

30. The optical pickup apparatus of claim 29, wherein the following formula is satisfied:

$$-0.02 < P_D < 0.02$$

$$P_D = -2 \cdot b_2$$

Where $P_D$ is the paraxial power (mm$^{-1}$) of the ring-shaped zonal structure formed on the objective lens.

31. The optical pickup apparatus of claim 30, wherein $P_D = 0$.

32. The optical pickup apparatus of claim 28, wherein the optical surface of the objective lens on which the ring-shaped zonal structure is formed includes a central region and a peripheral region, the central region includes the optical axis and is a continuous surface having no stepped section and the peripheral region encloses the periphery of the central region and has the stepped sections.

33. The optical pickup apparatus of claim 32, wherein the following formula is satisfied:

$$D1/D2 > 0.2$$

where D1 is the diameter of the central region, and

D2 is the maximum effective diameter of the optical surface on which the ring-shaped zonal structure is formed.

34. The optical pickup apparatus of claim 26, wherein the width of a ring-shaped zone in the ring-shaped zonal structure of the objective lens is changed non-periodically as the ring-shaped zone is located apart from the optical axis and the ring-shaped zonal structure is an optical path difference providing structure in which the shaping direction of the stepped section is reversed in the effective diameter of the objective lens.

35. The optical pickup apparatus of claim 34, wherein in the ring-shaped zonal structure, a ring-shaped zone neighboring to the outside of a ring-shaped zone including the optical axis is displaced in the optical axis direction so as to have a shorter optical path length than the ring-shaped zone including the optical axis, a ring-shaped zone located at the point of the maximum effective diameter is displaced in the optical axis direction so as to have a longer optical path length than a ring-shaped zone neighboring to an inside of the ring-shaped zone located at the point of the maximum effective diameter, and a ring shaped zone located at the point of 75% of the maximum effective diameter is displace in the optical axis direction so as to have a shorter optical path length that each of ring-shaped zones neighboring to the outside and inside of the ring-shaped zone located at the point of 75% of the maximum effective diameter.

36. The optical pickup apparatus of claim 34, wherein the following formula is satisfied:

$$D3/D4 > 0.2$$

where D3 is the diameter (mm) of the ring-shaped zone including the optical axis, and D4 is the maximum effective diameter (mm) of the optical surface of the objective lens.

37. The optical pickup apparatus of claim 26, wherein the following formula is satisfied:

$$\Delta SAR > \Delta SAD$$

where, when it is defined that a refractive lens has not the ring-shaped zonal structure and has the same design wavelength, the same material, the same focus length, the same image-side numerical aperture, the same magnification, the same lens thickness and the same back focus as those of the objective lens, $\Delta SAR$ is a change amount of the spherical aberration of a marginal ray when a light flux having a wavelength longer by 10 nm than the design wavelength comes into the refractive lens, for the spherical aberration of a marginal ray when a light flux having the design wavelength comes into the refractive lens, and $\Delta SAD$ is a change amount of the spherical aberration of a marginal ray when a light flux having a wavelength longer by 10 nm than the design wavelength comes into the objective lens, for the spherical aberration of a marginal ray when a light flux having the design wavelength comes into the objective lens.

38. The optical pickup apparatus of claim 26, wherein the following formula is satisfied:

$$\Delta SAD < 0$$

where $\Delta SAD$ is a change amount of the spherical aberration of a marginal ray when a light flux having a wavelength longer by 10 nm than the design wavelength comes into the objective lens, for the spherical aberration of a marginal ray when a light flux having the design wavelength comes into the objective lens.

39. The optical pickup apparatus of claim 26, wherein the following formula is satisfied:

$$|\Delta WFE1| < 0.03 \ \lambda \ \text{rms}$$

where $\Delta WFE1$ is a change amount of a wavefront aberration when a light flux having a wavelength longer by 10 nm than the design wavelength comes through the chromatic aberration correcting element into the objective lens, for a wavefront aberration when a light flux having the design wavelength comes through the chromatic aberration correcting element into the objective lens.

40. The optical pickup apparatus of claim 26, wherein the objective lens is a single lens.

41. The optical pickup apparatus of claim 26, wherein the objective lens is composed of a diffractive element having the optical surface on which the ring-shaped structure is formed and a converging element to converge a light flux having passed the diffractive element, and the following formula is satisfied:

$$|P2/P1| < 0.2$$

where P1 is a paraxial power (mm$^{-1}$) of the diffractive element, and P2 is a paraxial power (mm$^{-1}$) of the converging element.

42. The optical pickup apparatus of claim 26, wherein the objective lens has an image-side numerical aperture of 0.7 or more.

43. The optical pickup apparatus of claim 26, wherein the design wavelength is 500 nm or less.

44. The optical pickup apparatus of claim 26, wherein the ring-shaped zonal structure of the chromatic aberration correcting element is a diffractive structure in which the width of a ring-shaped zone is periodically decreased as the ring-shaped zone is placed apart from the optical axis.

45. The optical pickup apparatus of claim 44, wherein when the optical path difference $\Phi_b$ provided to a wavefront passing through the chromatic aberration correcting element is represented by an optical path difference function $\Phi_b$ defined by the formula of $(\Phi_b = b_2 \cdot h^2 + b_4 \cdot h^4 + b_6 \cdot h^6 + \ldots)$ as a function of a height h (mm) from the optical axis (where $b_2, b_4, b_6$ are second, fourth, sixth order optical path difference function coefficients respectively), the following formula is satisfied:

$$P_D > 0$$

where $P_D$ is a paraxial power (mm$^{-1}$) of the ring-shaped zonal structure.

46. The optical pickup apparatus of claim 45, wherein all of high order optical path difference function coefficients not less than fourth order in the optical path difference function $\Phi_b$ are zero.

47. The optical pickup apparatus of claim 26, wherein the ring-shaped zonal structure of the chromatic aberration correcting element is a optical path difference proving structure in which the width of a ring-shaped zone is changed non-periodically as the ring-shaped zone is located apart from the optical axis.

48. The optical pickup apparatus of claim 26, wherein the chromatic aberration correcting element is a coupling lens to convert a divergent angle of a divergent light flux emitted from a light source into an almost parallel light flux.

49. The optical pickup apparatus of claim 26, wherein the optical pickup apparatus comprises a coupling lens to convert a divergent angle of a divergent light flux emitted from a light source into an almost parallel light flux and the chromatic aberration correcting element is an expander lens of two lens groups provided on an optical path between the coupling lens and the objective lens.

50. The optical pickup apparatus of claim 26, wherein the optical pickup apparatus comprises a coupling lens to convert a divergent angle of a divergent light flux emitted from a light source into an almost parallel light flux and the chromatic aberration correcting element is an optical element of one lens group provided on an optical path between the coupling lens and the objective lens.

51. The optical pickup apparatus of claim 26, wherein when at least one of recording and reproducing information for the optical information recording medium is conducted, a tracking is conducted by displacing only the objective lens in a direction perpendicular to the optical axis with an actuator among the chromatic aberration correcting element and the objective lens.

52. An objective lens for use in an objective lens, comprising:
a ring-shaped zonal structure including plural ring-shaped zones on at least one optical surface thereof in which neighboring ring-shaped zones are divided with a stepped section shaped in the optical axis direction in such a way that the stepped section causes a optical path difference between light fluxes having passed through the neighboring ring-shaped zones;
wherein the following formula is satisfied:

$$SA1 > SA2$$

where, when it is defined that a refractive lens has not the ring-shaped zonal structure and has the same design wavelength, the same material, the same focal length, the same image-side numerical aperture, the same magnification, the same lens thickness and the same back focus as those of the objective lens, SA1 is a wavefront aberration ($\lambda$rms) when a light flux having a wavelength longer by 10 nm than the design wavelength comes into the refractive lens with a magnification larger by a predetermined value than the above magnification, and SA2 is a wavefront aberration ($\lambda$rms) when a light flux having a wavelength longer by 10 nm than the design wavelength comes into the objective lens with the magnification larger by the predetermined value than the above magnification.

53. The objective lens of claim 52, wherein the objective lens has an image-side numerical aperture of 0.7 or more.

54. The objective lens of claim 52, wherein the design wavelength is 500 nm or less.

55. The objective lens of claim 52, wherein the objective lens is a single lens.

56. The objective lens of claim 52, wherein the objective lens is composed of a diffractive element having the optical surface on which the ring-shaped structure is formed and a converging element to converge a light flux having passed the diffractive element, and the following formula is satisfied:

$$|P2/P1| < 0.2$$

where P1 is a paraxial power (mm$^{-1}$) of the diffractive element, and P2 is a paraxial power (mm$^{-1}$) of the converging element.

57. The objective lens of claim 52, wherein the width of a ring-shaped zone in the ring-shaped zonal structure is changed periodically as the ring-shaped zone is located apart from the optical axis and the ring-shaped zonal structure is a diffractive structure in which each stepped section is shaped in the same direction.

58. The objective lens of claim 57, wherein when the optical path difference provided by the ring-shaped zonal structure to a wavefront passing through the objective lens is represented by an optical path difference function $\Phi_b$ defined by the formula of ($\Phi_b = b_2 \cdot h^2 + b_4 \cdot h^4 + b_6 \cdot h^6 + \ldots$) as a function of a height h (mm) from the optical axis (where $b_2$, $b_4$, $b_6$ are second, fourth, sixth order optical path difference function coefficients respectively), at least one optical path difference function coefficient including fourth order optical path difference function coefficient among high order optical path difference function coefficients of fourth order or more has a value other than zero.

59. The objective lens of claim 58, wherein the following formula is satisfied:

$$-0.02 < P_D < 0.02$$

$$P_D = -2 \cdot b_2$$

Where $P_D$ is the paraxial power (mm$^{-1}$) of the ring-shaped zonal structure formed on the objective lens.

60. The objective lens of claim 59, wherein $P_D = 0$.

61. The objective lens of claim 57, wherein the optical surface of the objective lens on which the ring-shaped zonal structure is formed includes a central region and a peripheral region, the central region includes the optical axis and is a continuous surface having no stepped section and the peripheral region encloses the periphery of the central region and has the stepped sections.

62. The objective lens of claim 61, wherein the following formula is satisfied:

$$D1/D2 > 0.2$$

where D1 is the diameter of the central region, and
D2 is the maximum effective diameter of the optical surface on which the ring-shaped zonal structure is formed.

63. The objective lens of claim 62, wherein the following formula is satisfied:

$$D1/D2 > 0.3$$

where D1 is the diameter of the central region, and
D2 is the maximum effective diameter of the optical surface on which the ring-shaped zonal structure is formed.

64. The objective lens of claim 52, wherein the width of a ring-shaped zone in the ring-shaped zonal structure of the objective lens is changed non-periodically as the ring-shaped zone is located apart from the optical axis and the ring shaped zonal structure is an optical path difference providing structure in which the shaping direction of the stepped section is reversed in the effective diameter of the objective lens.

65. The objective lens of claim 64, wherein in the ring-shaped zonal structure, a ring-shaped zone neighboring to the outside of a ring-shaped zone including the optical axis is displaced in the optical axis direction so as to have a shorter optical path length than the ring-shaped zone including the optical axis, a ring-shaped zone located at the point of the maximum effective diameter is displaced in the optical axis direction so as to have a longer optical path length than a ring-shaped zone neighboring to an inside of the ring-shaped zone located at the point of the maximum effective diameter, and a ring-shaped zone located at the point of 75% of the maximum effective diameter is displace in the optical axis direction so as to have a shorter optical path length that each of ring-shaped zones neighboring to the outside and inside of the ring-shaped zone located at the point of 75% of the maximum effective diameter.

66. The objective lens of claim 64, wherein the following formula is satisfied:

$$D3/D4 > 0.2$$

where D3 is the diameter (mm) of the ring-shaped zone including the optical axis, and D4 is the maximum effective diameter (mm) of the optical surface of the objective lens.

67. The objective lens of claim 64, wherein the following formula is satisfied:

$$\Delta SAR > \Delta SAD$$

where, when it is defined that a refractive lens has not the ring-shaped zonal structure and has the same design wavelength, the same material, the same focus length, the same image-side numerical aperture, the same magnification, the same lens thickness and the same back focus as those of the objective lens, $\Delta SAR$ is a change amount of the spherical aberration of a marginal ray when a light flux having a wavelength longer by 10 nm than the design wavelength comes into the refractive lens, for the spherical aberration of a marginal ray when a light flux having the design wavelength comes into the refractive lens, and $\Delta SAD$ is a change amount of the spherical aberration of a marginal ray when a light flux having a wavelength longer by 10 run than the design wavelength comes into the objective lens, for the spherical aberration of a marginal ray when a light flux having the design wavelength comes into the objective lens.

68. The objective lens of claim 52, wherein the following formula is satisfied:

$$|\Delta WFE1| < 0.03 \, \lambda \, \text{rms}$$

where $\Delta WFE1$ is a change amount of a wavefront aberration when a light flux having a wavelength longer by 10 nm than the design wavelength comes into the objective lens, for a wavefront aberration when a light flux having the design wavelength comes into the objective lens.

69. The objective lens of claim 52, wherein the following formula is satisfied:

$$\Delta SAD < 0$$

where $\Delta SAD$ is a change amount of the spherical aberration of a marginal ray when a light flux having a wavelength longer by 10 nm than the design wavelength comes into the objective lens, for the spherical aberration of a marginal ray when a light flux having the design wavelength comes into the objective lens.

* * * * *